(12) United States Patent
Yamaoka

(10) Patent No.: US 6,258,225 B1
(45) Date of Patent: Jul. 10, 2001

(54) DEVICE FOR PRODUCING ION WATER

(76) Inventor: Tateki Yamaoka, 1217-3 Yamazakicho, Machida-shi, Tokyo (JP)

( * ) Notice: Subject to any disclaimer, the term of this patent is extended or adjusted under 35 U.S.C. 154(b) by 0 days.

(21) Appl. No.: 09/274,527

(22) Filed: Mar. 23, 1999

(51) Int. Cl.[7] .................................................. B01D 61/44
(52) U.S. Cl. .......................................... 204/263; 204/633
(58) Field of Search ..................................... 204/263, 633

(56) References Cited

U.S. PATENT DOCUMENTS 4,210,502 * 7/1980 Watanabe et al. ................... 205/749

* cited by examiner

Primary Examiner—Arun Phasge
(74) Attorney, Agent, or Firm—Jordan and Hamburg LLP

(57) ABSTRACT

A device for producing ion water having a pleasant odor, comprising an electrolytic cell containing two partition walls equipped with ion exchange membranes such that the cell is partitioned into three electrolytic chambers therein, said device also provided with spicery-supplying means such that ion water is produced inside at least one electrolytic chamber. In addition, an anode is located in the intermediate electrolytic chamber, and cathodes are located in the electrolytic chambers at both sides in the electrolytic cell respectively. Therefore, the desired pH of the ion water having a pleasant odor can be achieved by controlling the quantity of hydrogen ions generated as determined by the amount of electricity delivered.

14 Claims, 28 Drawing Sheets

DEVICE FOR PRODUCING ION WATER

BACKGROUND OF THE INVENTION

The present invention is related to a device for producing ion water by electrolysis which generates alkaline functional water (alkaline ion water) for the promotion of health and water (acid ion water) for use in medical applications, e.g. sterilization or the like.

A conventional device for the electrolysis of water has been composed of an electrolytic cell in which is disposed an ion exchange membrane at the central portion thereof; an anode disposed in one of electrolytic chambers of the electrolytic cell; and a cathode disposed in another electrolytic chamber in the electrolytic cell, and the electrolysis of water is accomplished by the above-mentioned device.

By conventional electrolysis using an ion exchange membrane, most electric charge movements are effected by movement of cations from the anode to the cathode. Further, in order to prevent contrary movement of hydroxide ions, a fall of pH of the acid ion water which has formed in the anode chamber is effected.

Additionally, when it is formed by the electrolysis of an equivalent quantity of water, the reaction in the cathode chamber includes an undesirable rise in the pH of the alkaline ion water, and a pleasant odor of the alkaline ion water or acid ion water cannot be achieved.

SUMMARY OF THE INVENTION

In view of the foregoing, it is an object of the present invention to provide a device for producing ion water by means of which a desired pH of ion water can be achieved by controlling the quantity of hydrogen ions generated as determined by the amount of electricity delivered which can be reduced by half. It is another object of the present invention to provide a device which can produce alkaline ion water and acid ion water that have a pleasant odor.

It is more specific object of the present invention to provide a device for producing ion water by means of which water introduced into the electrolytic cell is electrolyzed into pure ion water. Furthermore, it is still another object of the present invention to provide a device for producing ion water having a high ion density.

The novel features which are believed to be characteristic of the invention, both as to its organization and method of operation, together with further objects and advantages thereof, will be better understood from the following description considered in connection with accompanying drawings in which a presently preferred embodiment of the invention is illustrated by way of example. It is to be expressly understood, however, that the drawings are for. the purpose of illustration and description only, and are not intended as a definition of the limits of the invention.

DESCRIPTION OF THE PREFERRED EMBODIMENT

Preferred embodiments of the present invention will now be described in more detail below referring to the accompanying drawings.

FIGS. 1 to 6 illustrate a first embodiment of the present invention wherein numeral 1 is an electrolytic cell which can electrolyze the water, the electrolytic cell 1 being located in an upper portion of a frame 2. Numeral 4,4 are support members which are located at an inner wall surface of the electrolytic cell 1 such that the electrolytic cell 1 is partitioned into three electrolytic chambers 3, 3A, 3, respectively.

Figure 1:
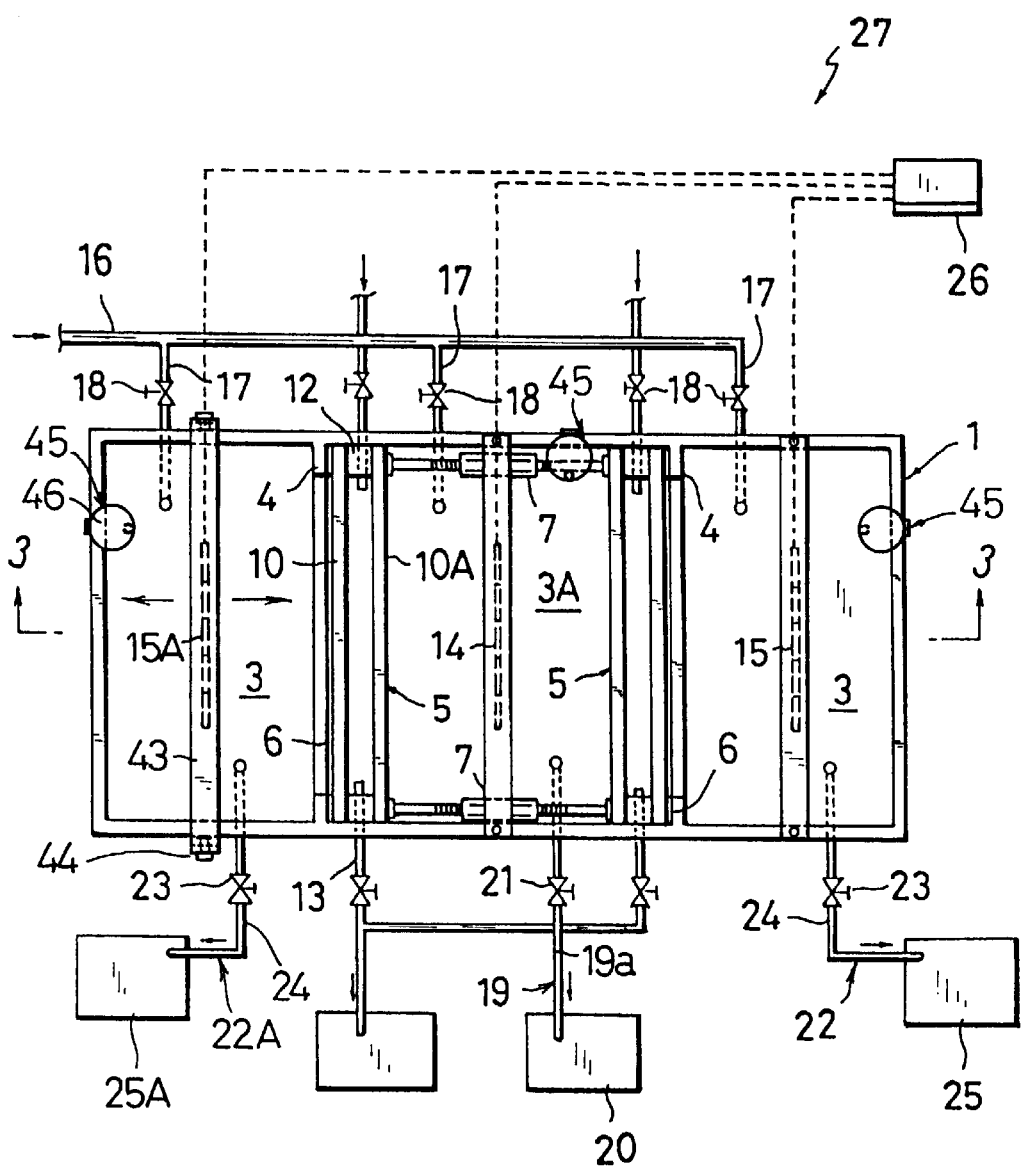
FIG. 1 is a plan view showing a first embodiment of the present invention.
Figure 2:
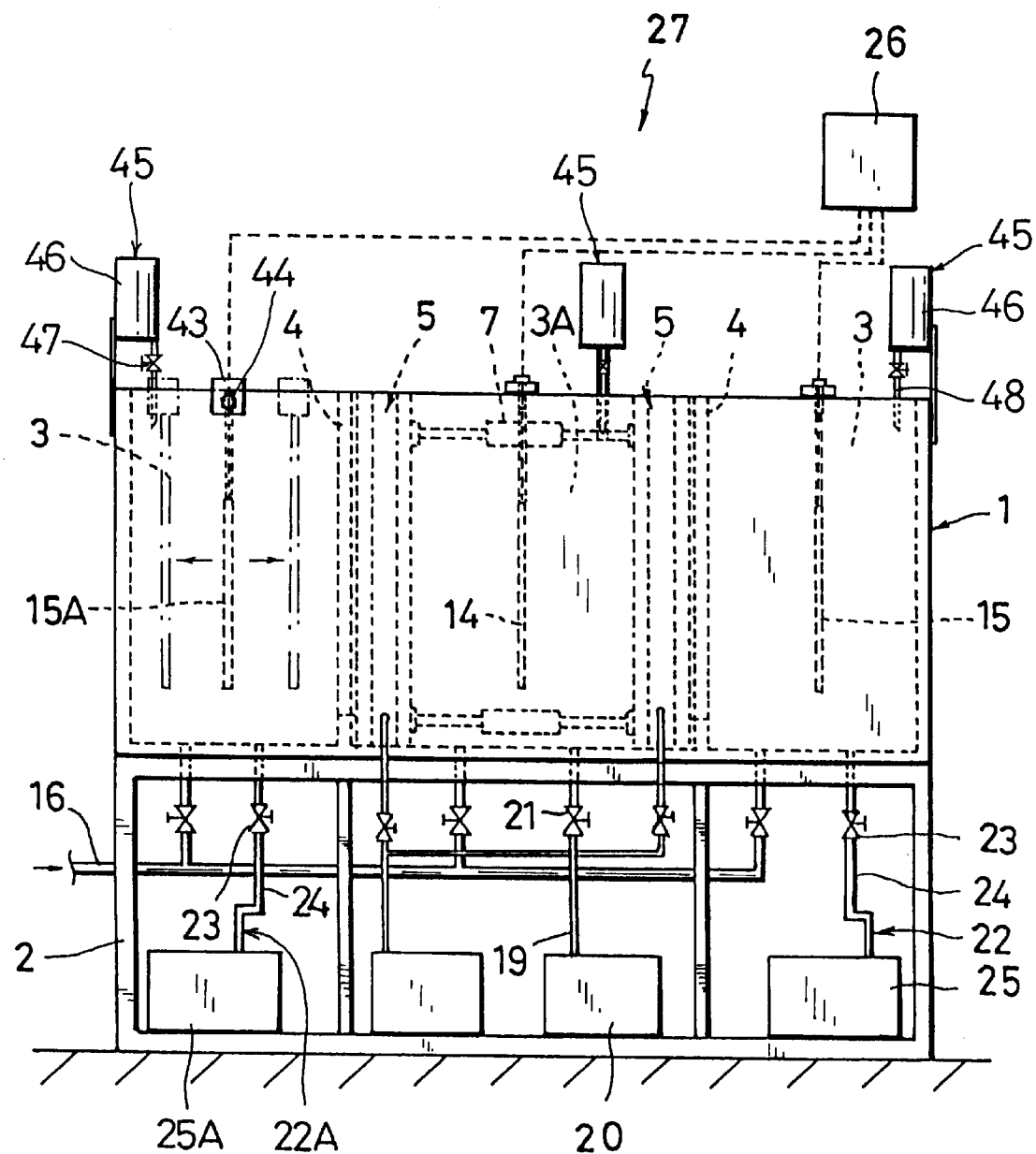
FIG. 2 is a front view showing a first embodiment of the present invention.
Figure 3:
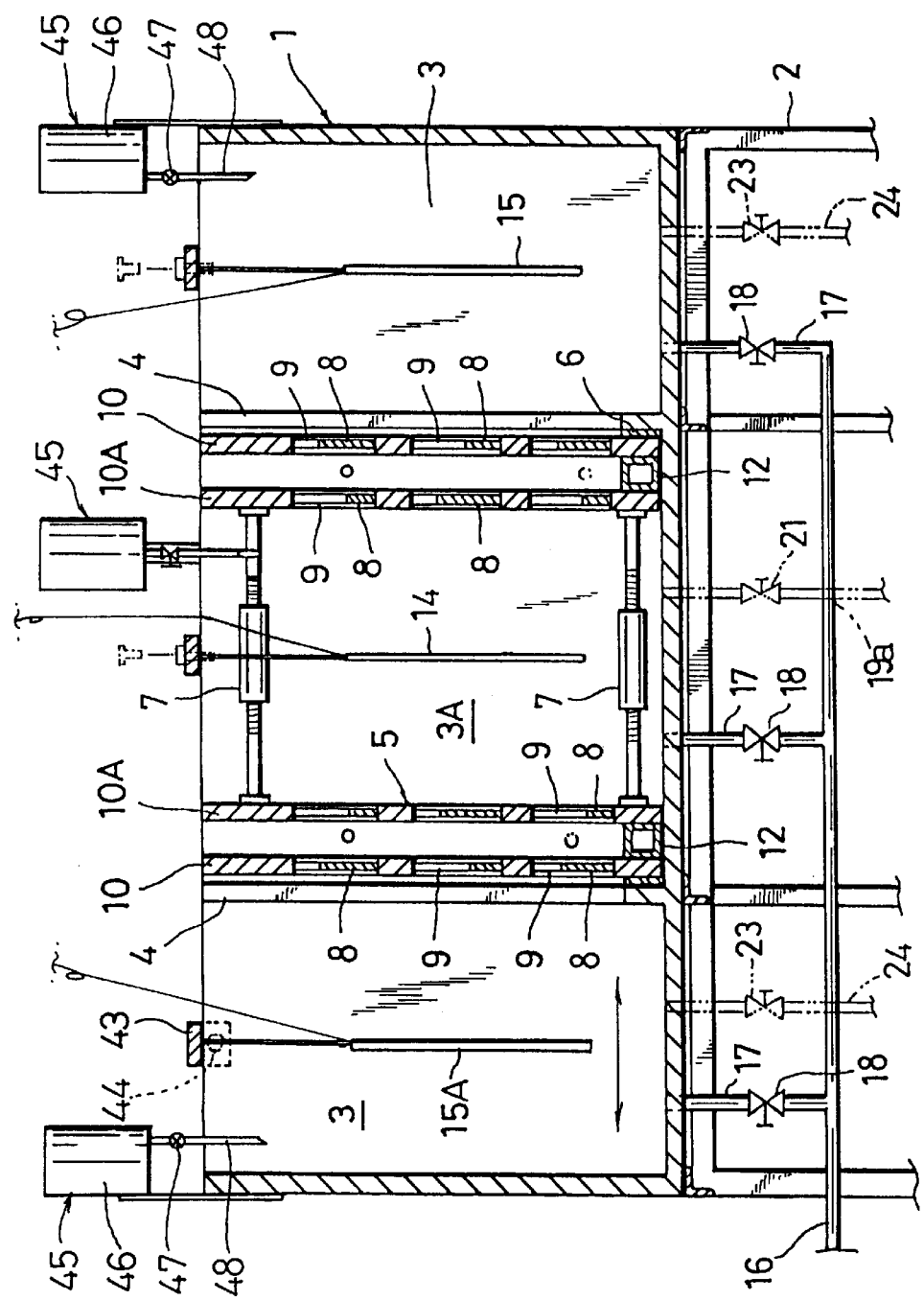
FIG. 3 is an expanded cross sectional view taken along the line 3—3 of FIG. 1.
Figure 4:
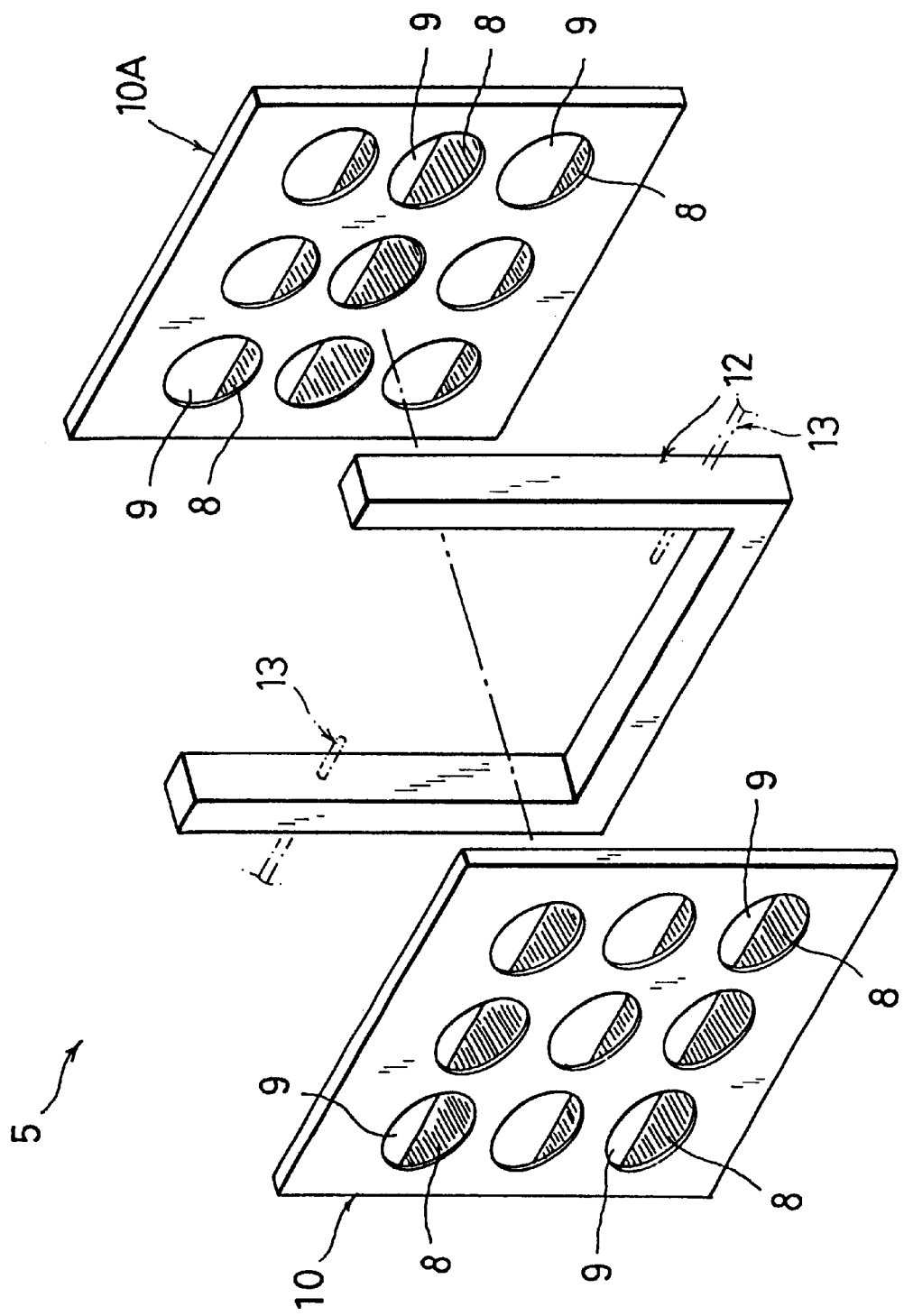
FIG. 4 is an exploded perspective view of a partition wall showing a first embodiment of the present invention.
Figure 5:
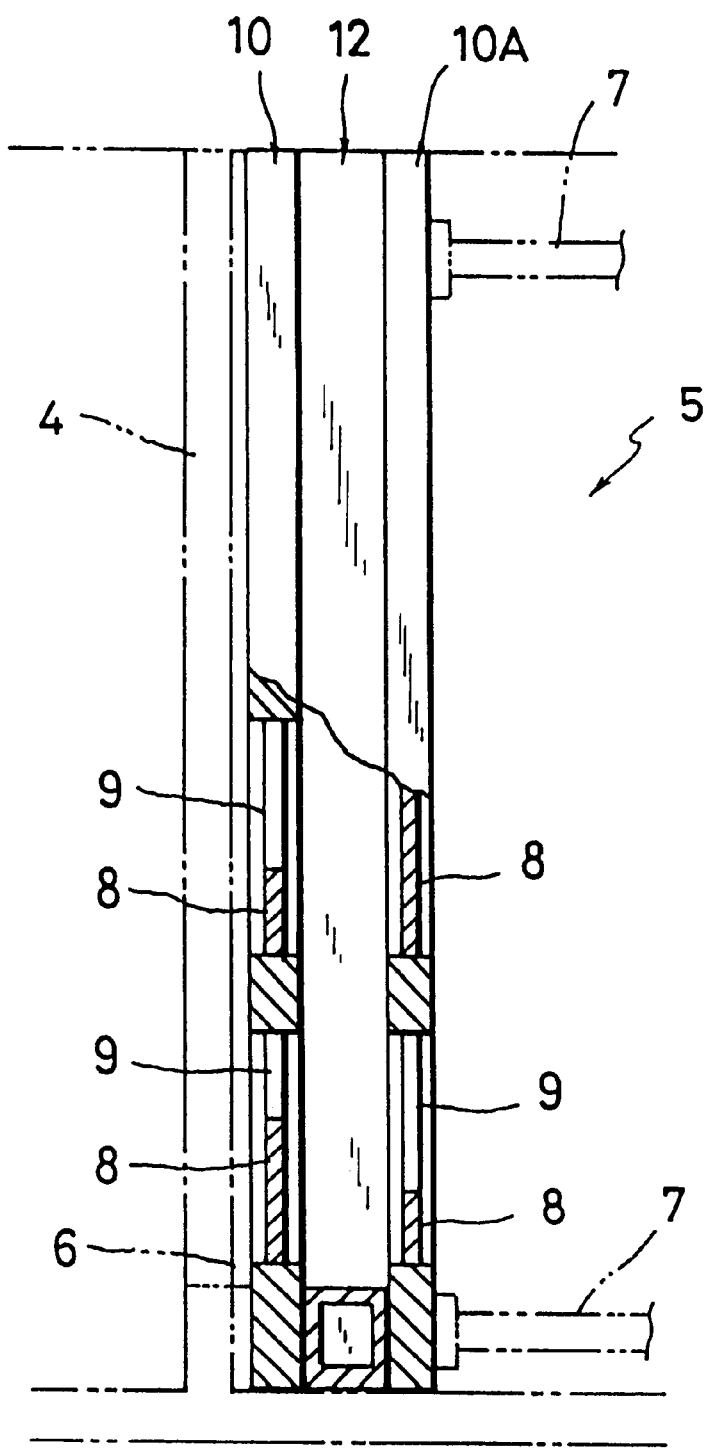
FIG. 5 is a partial cut-off explanation view of a partition wall according to a first embodiment of the present invention.

Numeral 5, 5 are of partition walls which are fixed by pressure with press tools 7, 7, 7 and 7 using four turn-buckle mechanisms via seal materials 6, 6 on support members 4, 4 which partition the electrolytic cell 1 into three electrolytic chambers 3, 3A, 3. The partition walls 5, 5 as illustrated in FIGS. 4 and 5 are composed of a pair of partition wall bodies 10, 10A; a framed body 12 in the shape of a channel; and a water supply pipe 13. The partition wall bodies 10, 10A are attached to a plurality of anode exchange membranes 8 and a plurality of cathode exchange membranes 9 thereto, the partition wall bodies 10, 10A being supported by support members 4,4. The framed body 12 is provided to form a water chamber 11 between the partition wall bodies 10, 10A. The water supply pipe 13 supplies feed water to water chamber 11 in framed body 12.

Numeral 14 indicates a non-movable anode which is a platinum plated 10 titanium element, anode 14 being positioned fixedly in the intermediate electrolytic chamber 3A of electrolytic cell 1.

Numeral 15 indicates a non-movable cathode which is located fixedly in electrolytic cell 1 such that cathode 15 is positioned adjacent a central portion of the cell in chamber 3, cathode 15 being a platinum plated titanium element and being fed half the electric current of of that flowing to anode 14.

Numeral 15A indicates a movable cathode of a platinum plated titanium element placed in electrolytic cell 1 allowing for a setting position to be chosen using a support member 43 fitted by locking bolts 44,44 such that cathode 15A can be positioned optionally into another electrolytic chamber 3 of the electrolytic cell 1. Also cathode 15A supplies half the amount of the electric current flowing to anode 14.

Numeral 16 indicates a water pipe supplying feed water to be electrolyzed to each electrolytic chamber 3, 3A, 3 of electrolytic cell 1 by branch pipes 17, 17, 17. Branch pipes 17, 17, 17 of supply pipe 16 have opening and shutting valves 18, 18, 18 which are interposed between branch pipes 17 and supply pipe 16, respectively.

Numeral 19 indicates a collecting device which drains pure acid ion water generated in intermediate electrolytic chamber 3A of electrolytic cell 1 to acid ion water storage tank 20 through acid ion water drainpipe 19a having an opening and shutting valve 21.

Numerals 22,22A are collecting devices which drain pure alkaline ion water generated in electrolytic chambers 3,3 located at both sides of electrolytic cell 1 to alkaline ion water storage tanks 25, 25A through alkaline ion water drainpipes 24,24 having opening and shutting valves 23,23.

Numeral 26 indicates a voltage controller that controls the voltage supplying the amount of a desired electric current to anode 14, nonmovable cathode 15 and movable cathode 15A.

Numerals 45,45,45 indicates devices for supplying liquid spices having a flavor of orange, peach, lemon, tea, or the like into the intermediate electrolytic chamber 3A and electrolytic chambers 3,3 located at both side portions of electrolytic cell 1, respectively. Spicery supplying device 45 further comprises liquid spice storage tanks 46,46,46 and nozzles 48,48,48 having valves 47,47,47, the nozzles 48 being attached to storage tank 46 and supplying liquid spice from storage tank 46 in a water-drop pattern.

At start-up of device 27 for producing ion water of the abovementioned structure, movable cathode 15A is placed in a position equal to the distance between anode 14 and the non-movable cathode 15 when alkaline ion water is generated in each of electrolytic chambers 3,3 of electrolytic cell 1. On the other hand, movable cathode 15A is placed in a position such that the distance between anode 14 and movable cathode 15A is equal to that between the anode 14 and cathode 15.

Then, valves 18, 18, 18 of water supply pipe 16 are opened, supplying a predetermined quantity of feed water into the electrolytic chambers 3, 3A respectively, and after which valves 18, 18, 18 are shut. In addition, water is supplied to water chambers 11, 11 by the water supply pipes 13, 13 of partition walls 5, 5. In addition, spice supplying device 45 supplies a drop or some drops of liquid spice into chambers 3,3A,3.

Additionally, the liquid spice which is supplied to electrolytic chambers 3,3A,3 may be the same, or different liquid spice may be used in such electrolytic chambers.

Afterward, an electric current flows to anode 14, and non-movable cathode 15 and movable cathode 15A in a fixed time, and the water is electrolyzed.

Figure 6:
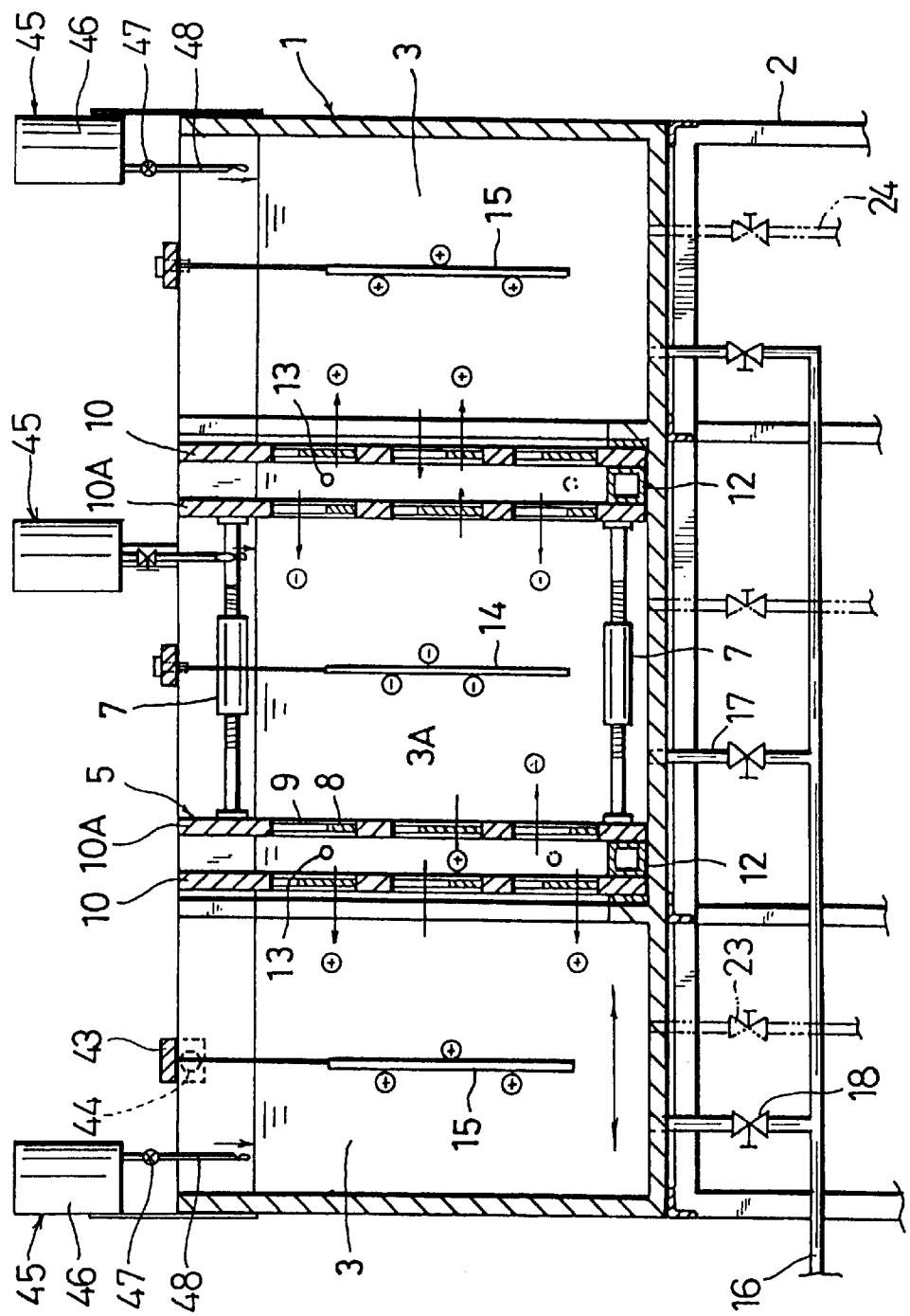
FIG. 6 is an explanation view during electrolysis according to a first embodiment of the present invention.

Then, the anions and cations which move electric charge by an electrolysis reaction are separated by the cation exchange membrane and the anion exchange membranes, and they are selected thereby. As illustrated in FIG. 6, the cations of the water in intermediate electrolytic chamber 3A, containing anode electrode 14, of electrolytic cell 1 pass through cation exchange membranes 8, 8 in partition wall bodies 10, 10A which are provided in partition walls 5, 5. Cations are introduced into the electrolytic chambers 3, 3, having non-movable cathode 15 and movable cathode 15A, which are located at both sides of electrolysis cell 1.

Moreover, anions in the water of electrolytic chambers 3, 3, containing non-movable cathode 15 and movable cathode 15A, which are provided at both side portions of electrolytic cell 1 pass through anion exchange membranes 9, 9 in partition wall bodies 10, 10A of partition walls 5, 5. Anions are introduced into the electrolytic chamber 3A, having anode 14, which is provided at the central portion of the electrolytic cell 1.

In addition, cations in the feed water supplied to water chambers 11, 11 respectively located between the pairs of partition wall bodies 10, 10A and 10, 10A of the partition walls 5, 5 are introduced into electrolytic chambers 3, 3 located at both sides of electrolytic cell 1. Also, anions are introduced into intermediate electrolytic chamber 3A, and ion concentration is raised. Then, pure acid ion water, having the odor of the introduced spice at a pH of 3.0 to 3.2 is generated in intermediate electrolytic chamber 3A. Also pure alkaline ion water, having the odor of the introduced spice having a pH in the range of 9.2. to 9.8 or the different range of 9.1 to 9.5 or 9.6 to 9.9 is also generated in electrolytic chambers 3, 3 located at both sides of electrolytic cell 1.

When acid ion and alkaline ion water having the odor of the introduced spice are generated in this way, opening and shutting valve 21 of acid ion water drainpipe 19a is opened, and the acid ion water is stored it in acid ion water storage tank 20. Also the opening and shutting valves 23,23 of alkaline ion water drainpipes 22,22A are opened, and alkaline ion water is stored in alkaline ion water storage tanks 25, 25A.

Furthermore, the water which is passed through partition walls 5, 5 can be used as the spare water to produce pure water.

DIFFERENT PREFERRED EMBODIMENTS OF THE INVENTION

Other embodiments of the present invention will now be described referring to FIGS. 7 to 31. Throughout the drawings of the embodiments, like components are denoted by like numerals as of the first embodiment and will not therefore be explained in greater detail.

Figure 7:
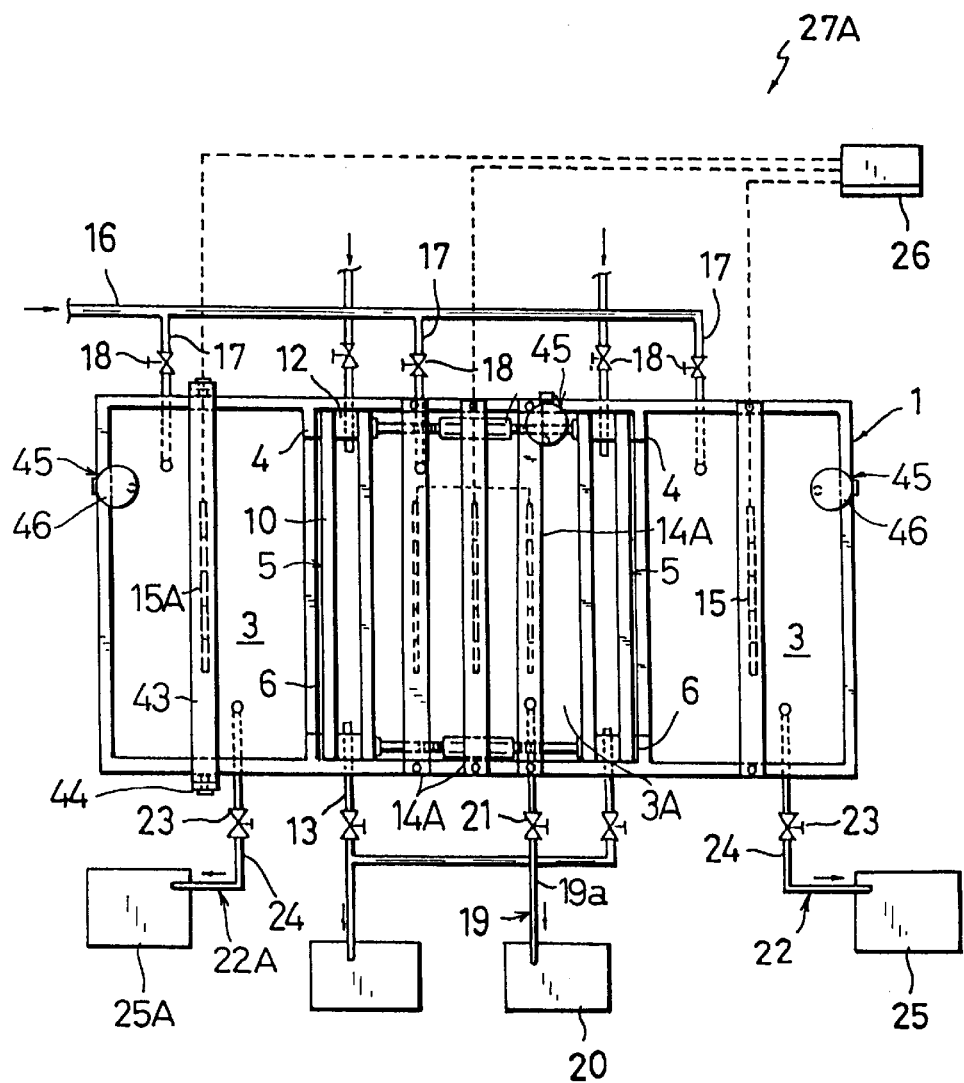
FIG. 7 is a plan view showing a second embodiment of the present invention.
Figure 8:
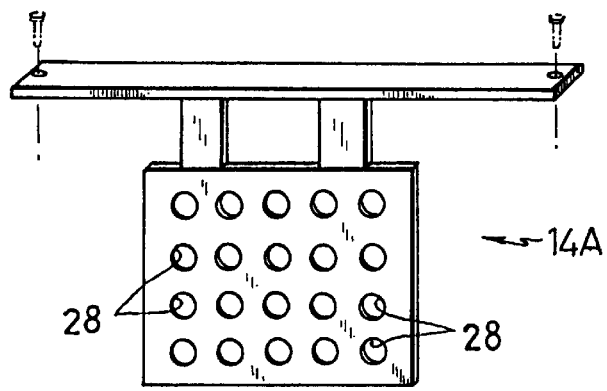
FIG. 8 is an explanation view of an anode showing a second embodiment of the present invention.

FIGS. 7 and 8 illustrate the second embodiment of the present it invention; this is distinguished from the first embodiment in that two or more anodes, three of which 14A, 14A, 14A are shown in FIGS. 7 and 8, are platinum plated titanium plates, having a plurality of holes 28, and are arranged in a row at predetermined intervals in intermediate electrolytic chamber 3A of electrolytic cell 1. This results in a reduction in the amount of electricity utilized. Moreover, such structures can be used to effect the electrolysis of water containing heavy metal. Also ion can move through the holes 28 of anodes 14A, 14A, 14A, and device 27A can be used to produce strongly acid ion water and strongly alkaline ion water easily.

Figure 9:
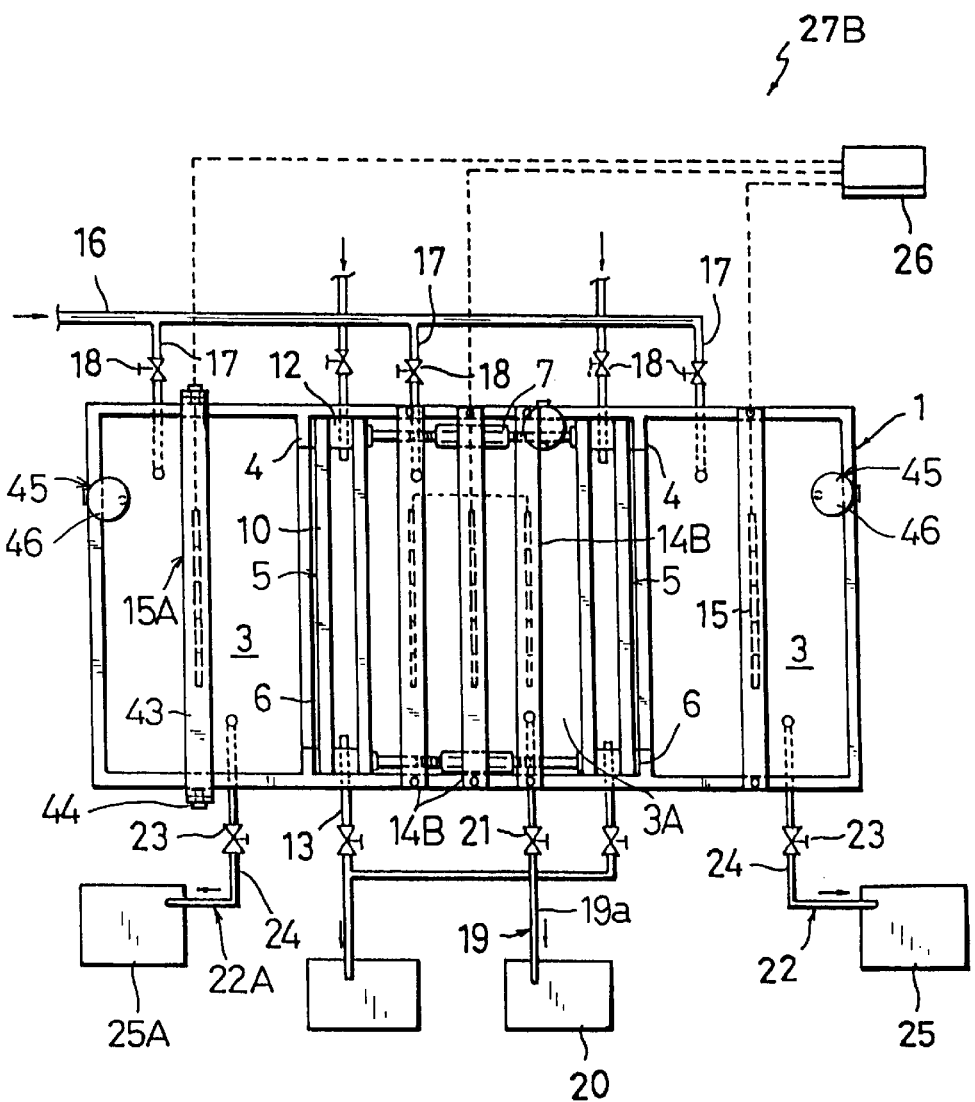
FIG. 9 is a plan view showing a third embodiment of the present invention.
Figure 10:
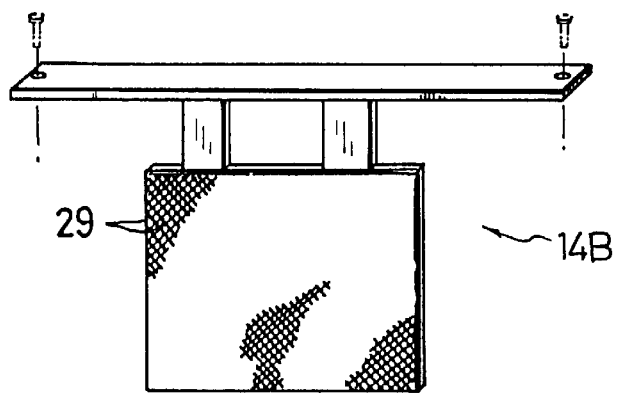
FIG. 10 is an explanation view of an anode showing a second embodiment of the present invention.

FIGS. 9 and 10 illustrate the third embodiment of the present invention; this is distinguished from the second embodiment in that at least two anodes, three of which 14B, 14B, 14B are shown in FIGS. 9 and 10, are woven or knitted from linear material 29 composed of platinum plated titanium in the form of a mesh and arranged in a row at predetermined intervals in intermediate electrolytic chamber 3A of electrolytic cell 1. A device for producing ion water 27B according to the third embodiment will provide the same function as of the second embodiment.

Figure 11:
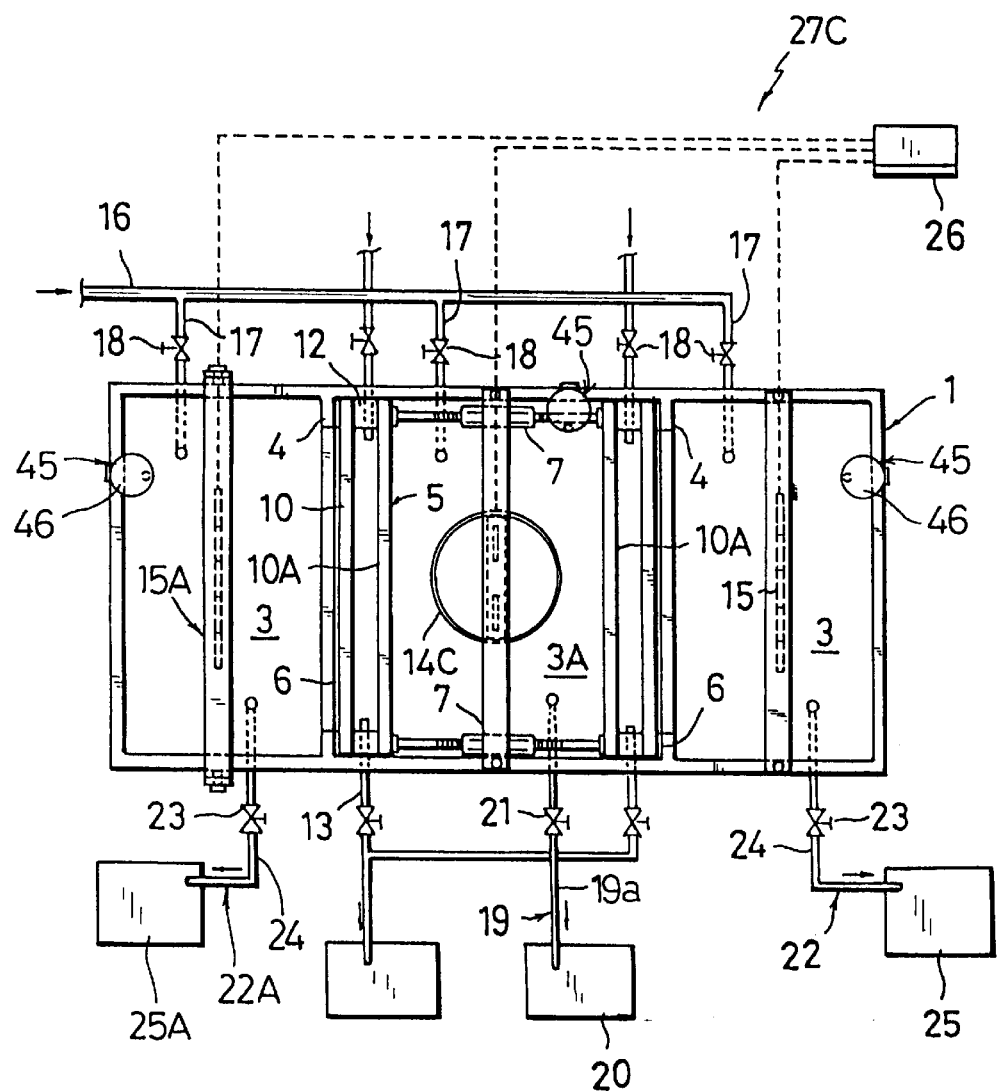
FIG. 11 is a plan view showing a fourth embodiment of the present invention.
Figure 12:
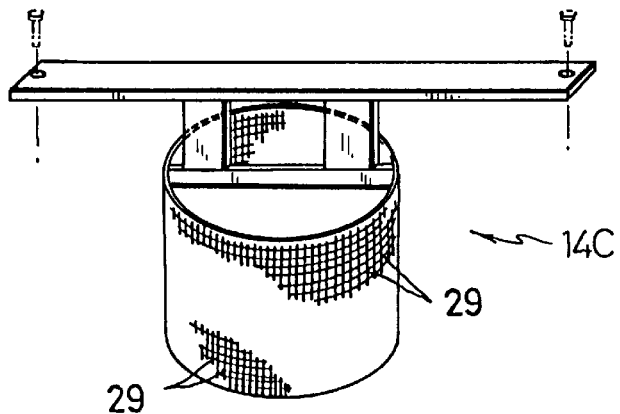
FIG. 12 is an explanation view of an anode showing a fourth embodiment of the present invention.

FIGS. 11 and 12 illustrate the fourth embodiment of the present invention; this is distinguished from the second embodiment in that anode 14C is woven or knitted from linear material 29 composed of platinum plated titanium in the form of a mesh in the shape of a cylinder, such anode being located in intermediate electrolytic chamber 3A of the electrolytic cell 1. Device 27C according to the fourth embodiment will provide the same function as that of the second embodiment.

Figure 13:
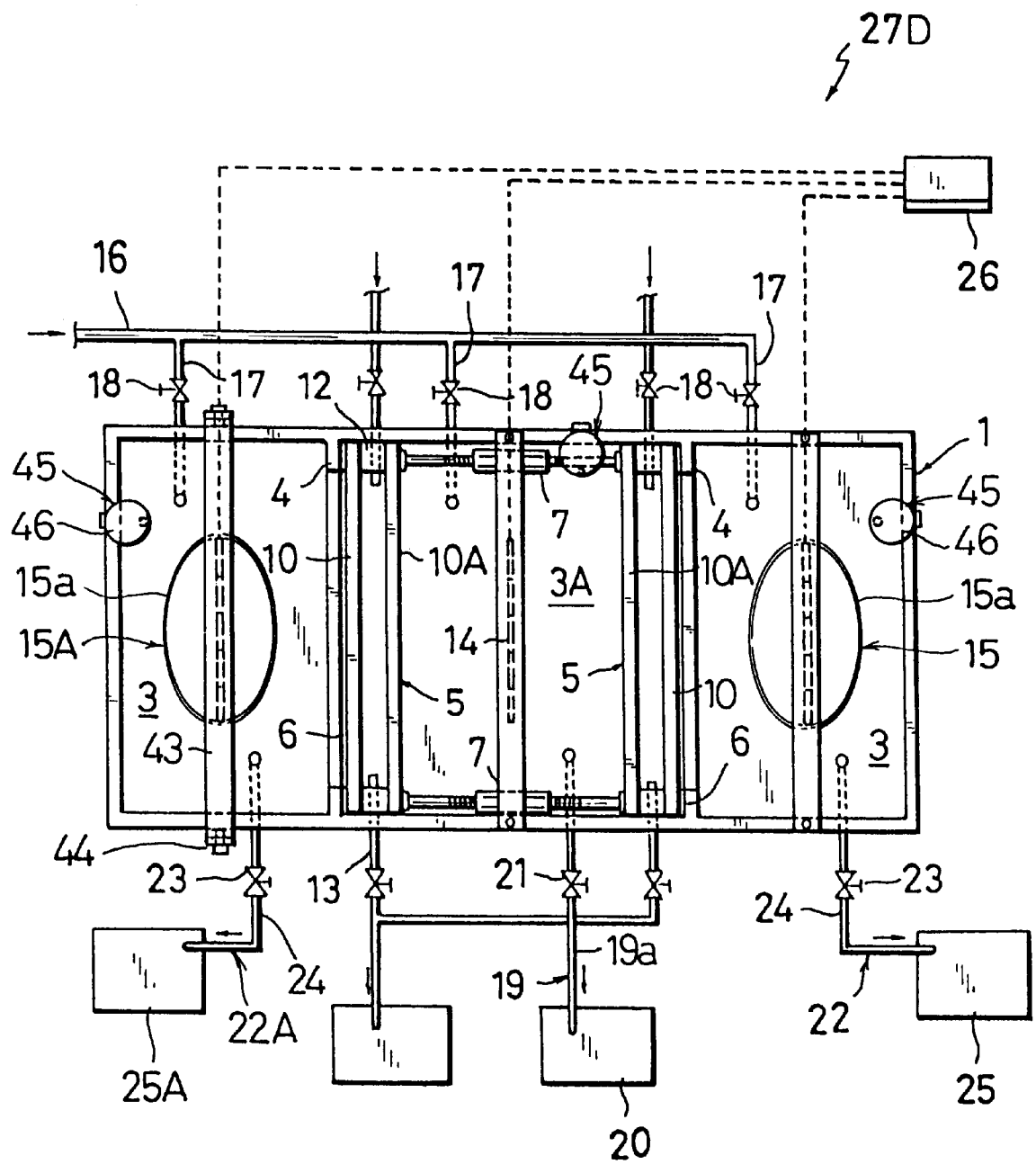
FIG. 13 is a plan view showing a fifth embodiment of the present invention.
Figure 14:
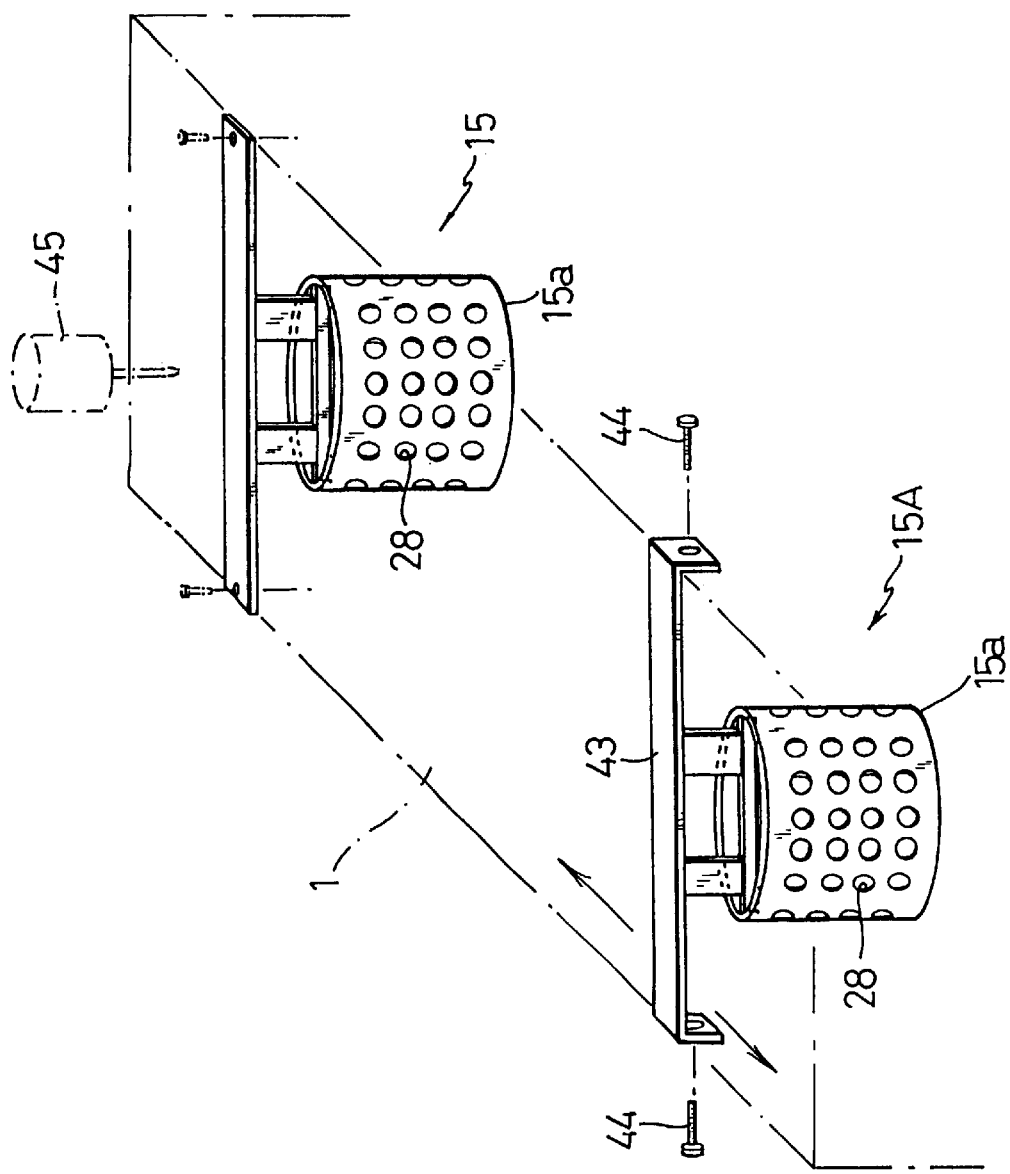
FIG. 14 is an explanation view of a cathode showing a fifth embodiment of the present invention.

FIGS. 13 and 14 illustrate the fifth embodiment of the present invention; this is distinguished from the first embodiment in that different forms of non-movable cathode 15 and movable cathode 15A are used. Cathodes 15 and 15A include electrode plates 15a and 15a each in the shape of an oval-shaped cylinder, and composed of a platinum plated titanium base having a plurality of holes 28 and positioned in electrolytic chambers 3 and 3 at the sides of electrolytic cell 1. Device 27D according to the fifth embodiment will provide the same function as that of the first embodiment of the present invention.

Figure 15:
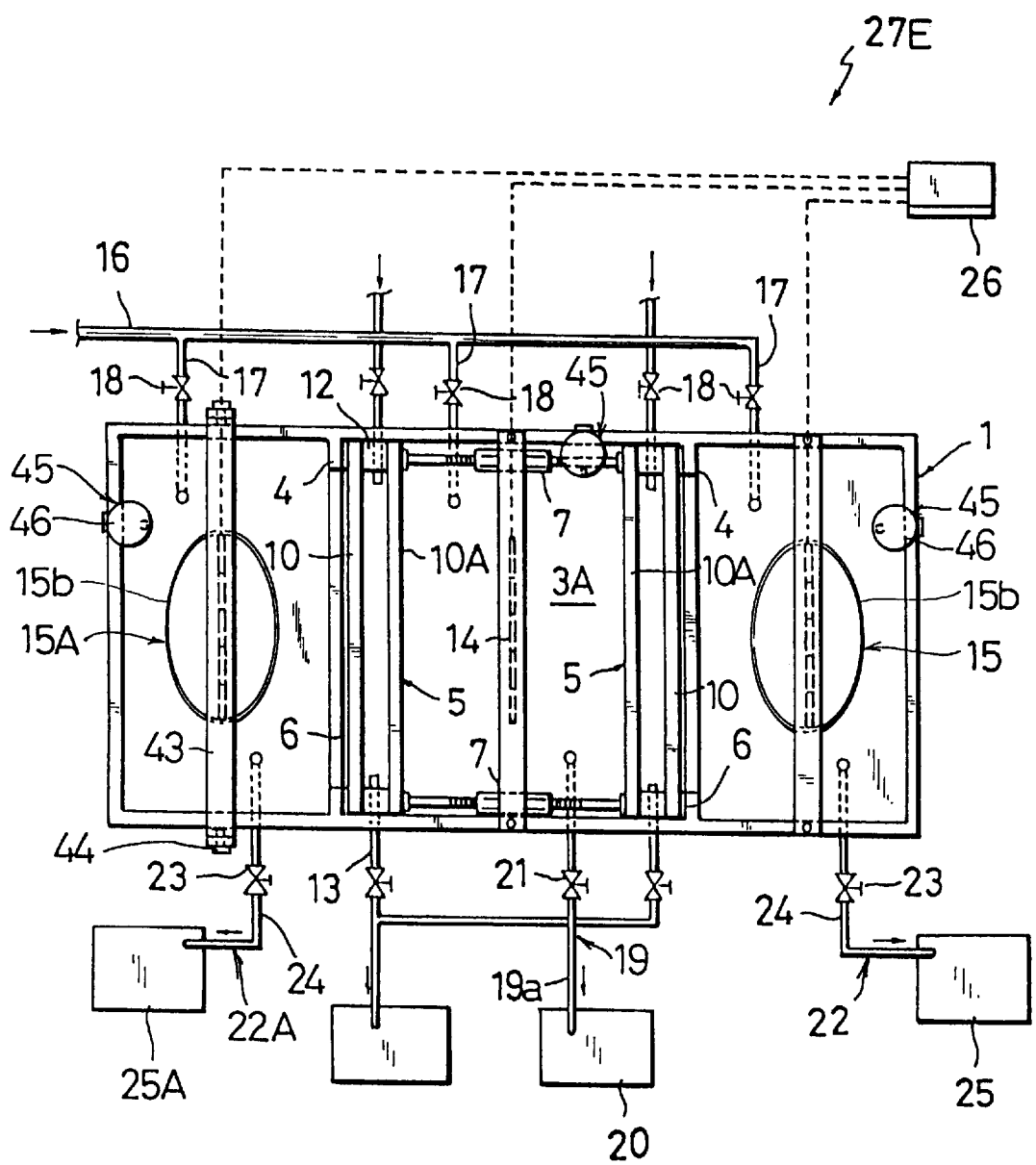
FIG. 15 is a plan view showing a sixth embodiment of the present invention.
Figure 16:
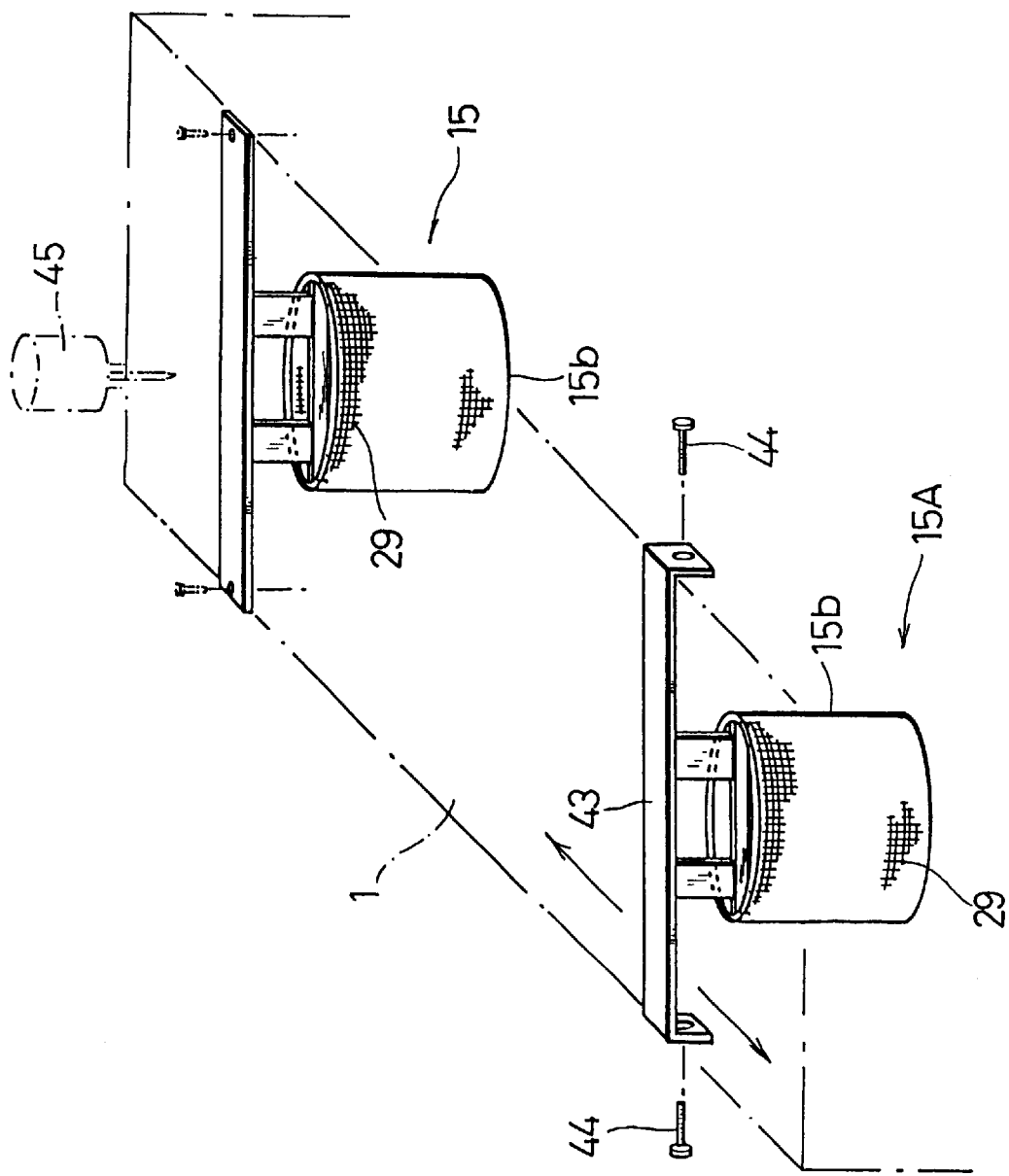
FIG. 16 is an explanation view of a cathode showing a sixth embodiment of the present invention.

FIGS. 15 and 16 illustrate the sixth embodiment of the present invention which is distinguished from the fifth embodiment by the fact that different forms of non-movable cathode 15 and movable cathode 15A are used. Cathodes 15 and 15A include electrode elements 15a and 15a each in the shape of an oval-shaped cylinder formed from a mesh which is woven or knitted from a linear material 29 which is platinum plated titanium. Device 27E according to the sixth embodiment will provide the same function as that of the fifth embodiment of the present invention.

Figure 17:
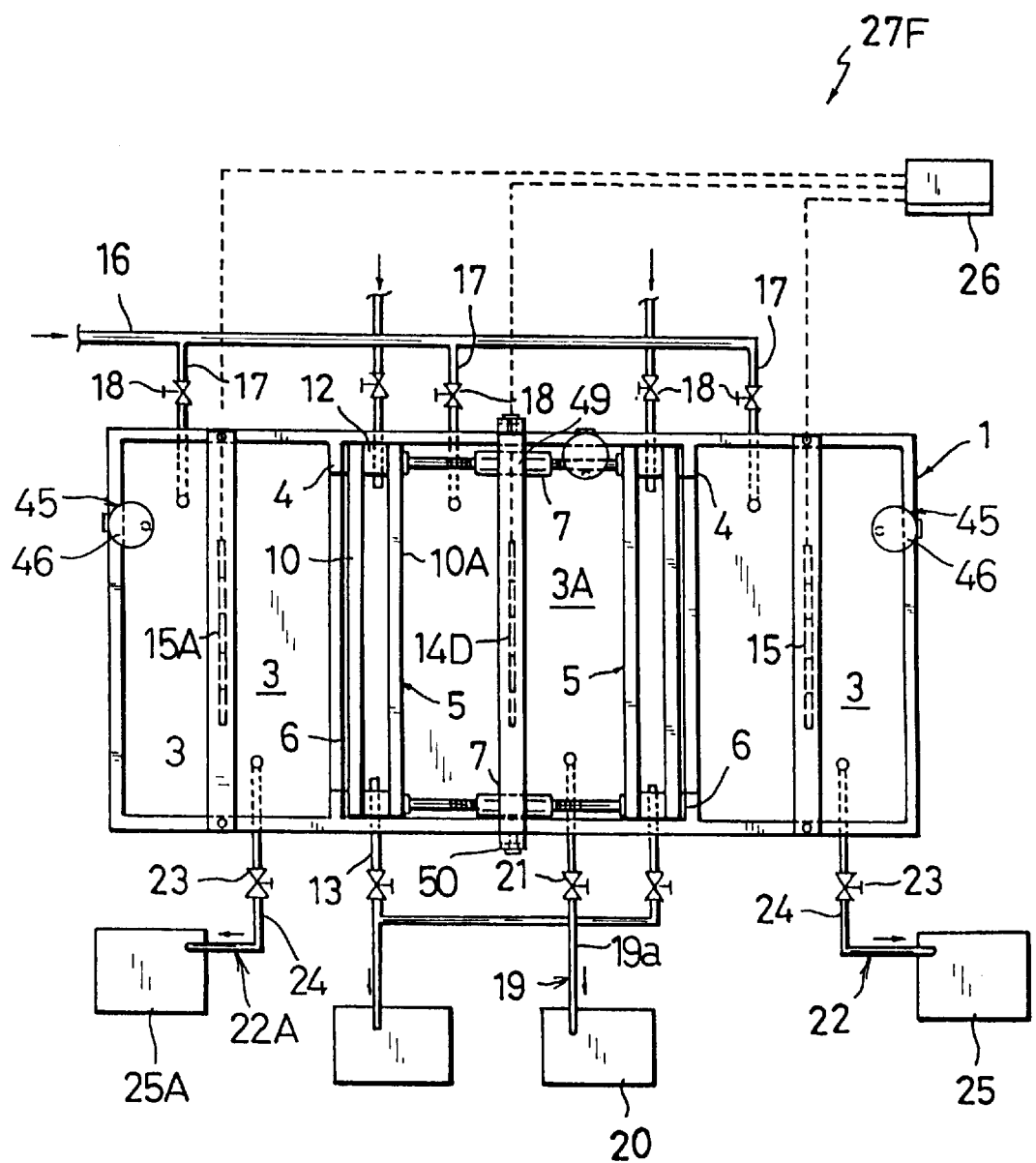
FIG. 17 is a plan view showing a seventh embodiment of the present invention.
Figure 18:
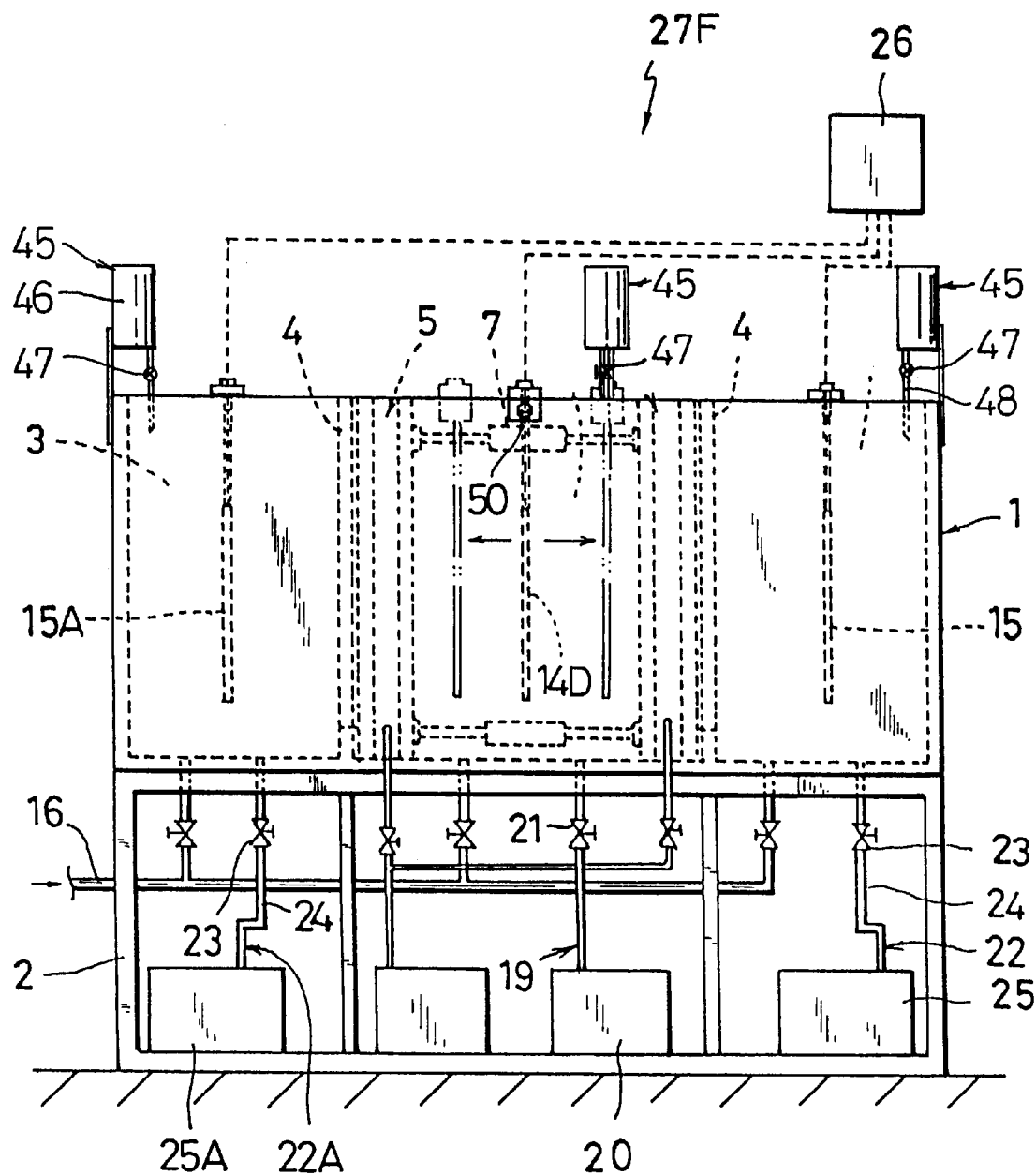
FIG. 18 is a front view showing a seventh embodiment of the present invention.

FIGS. 17 and 18 illustrate the seventh embodiment of the present invention; this is distinguished from the first embodiment in that cathodes 15 and 15A located at both side portions of electrolytic cell 1, are non-movable, and anode 14D is provided with anode support member 50 locked by bolts 49 and 49 in electrolytic chamber 3A of electrolytic cell 1 such that the anode 14D is positioned optionally. Device 27F according to the seventh embodiment will provide the same function as that of the first embodiment of the present invention.

Figure 19:
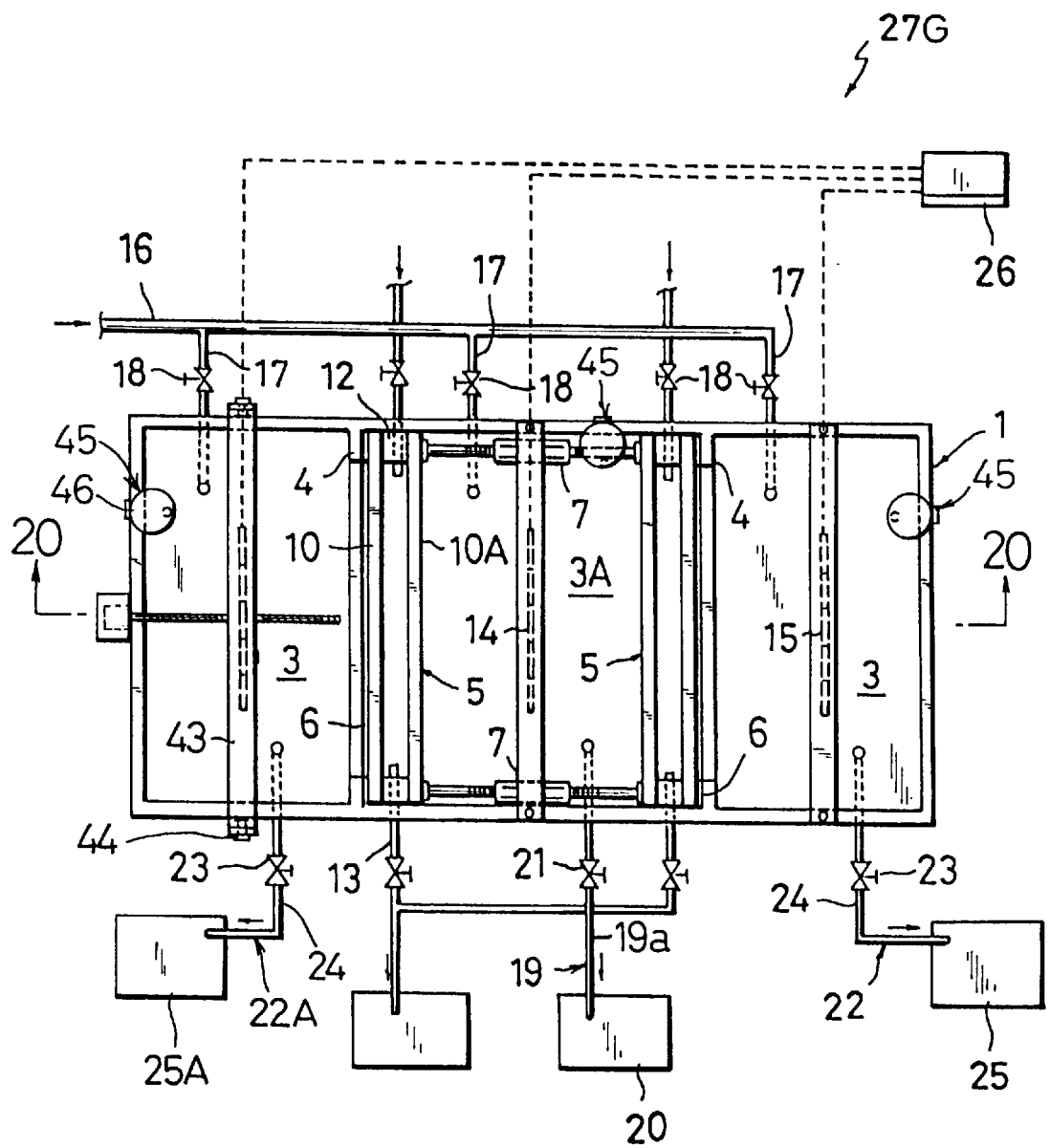
FIG. 19 is a plan view showing an eighth embodiment of the present invention.
Figure 20:
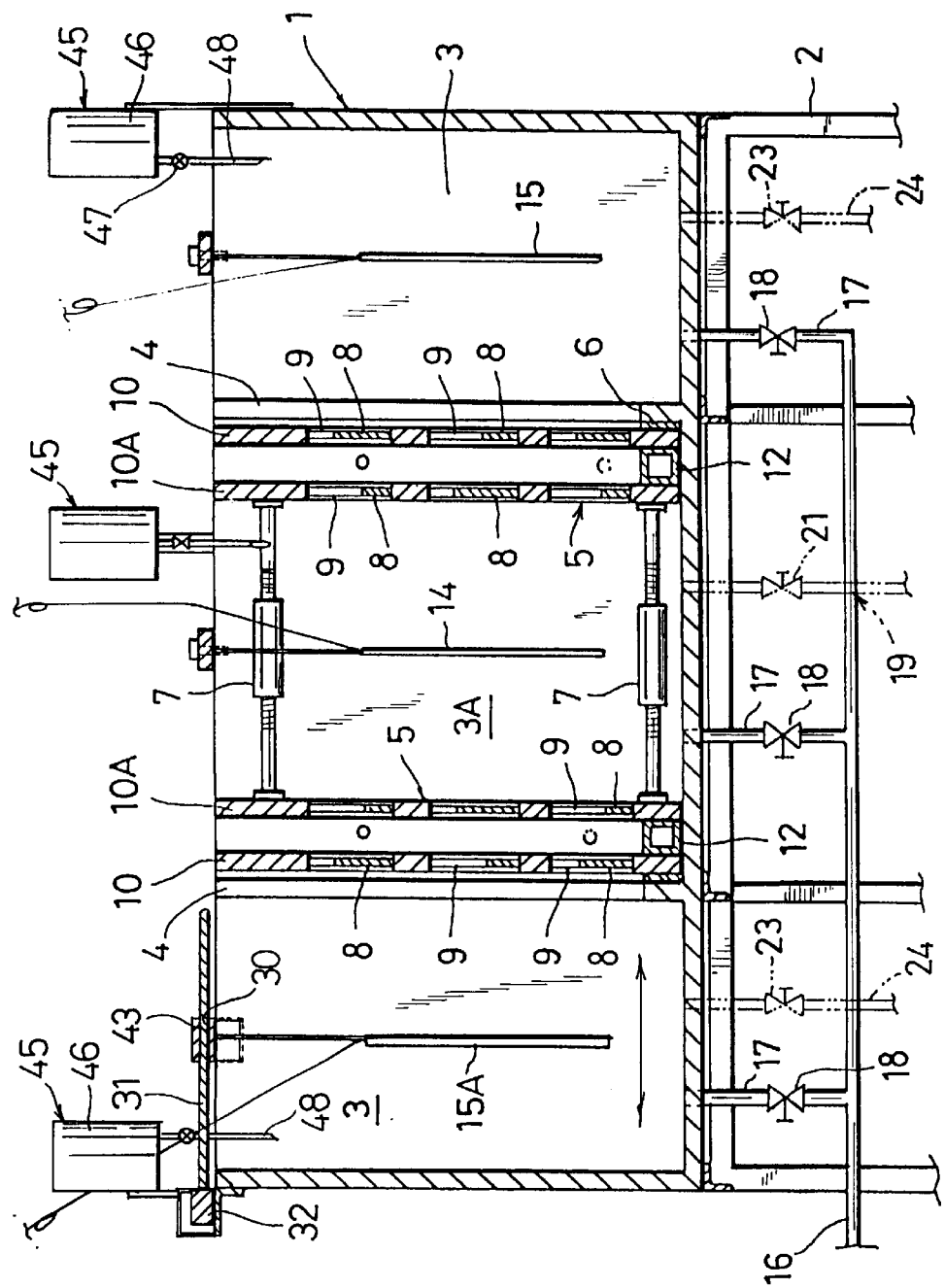
FIG. 20 is an expanded cross sectional view taken along the line 20—20 of FIG. 19.
Figure 21:
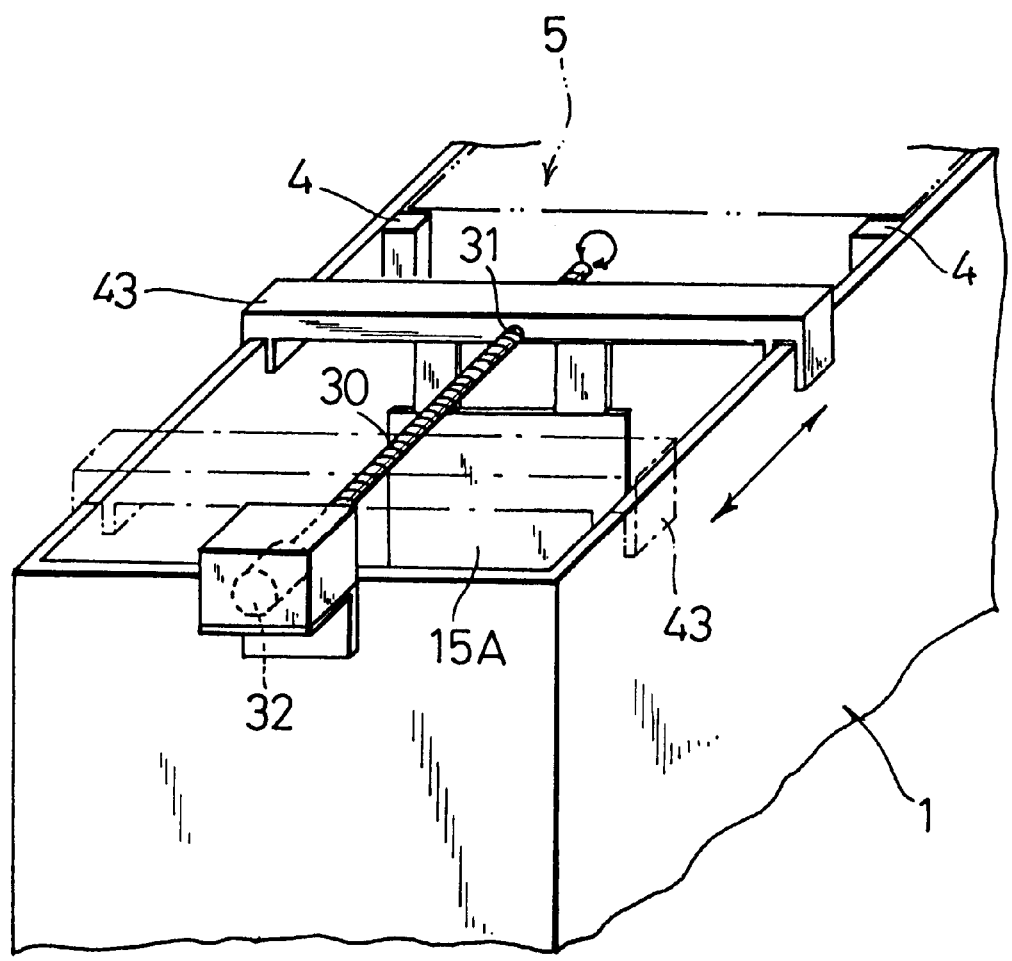
FIG. 21 is an explanation view in a condition that the cathode moves showing an eighth embodiment of the present invention.
Figure 22:
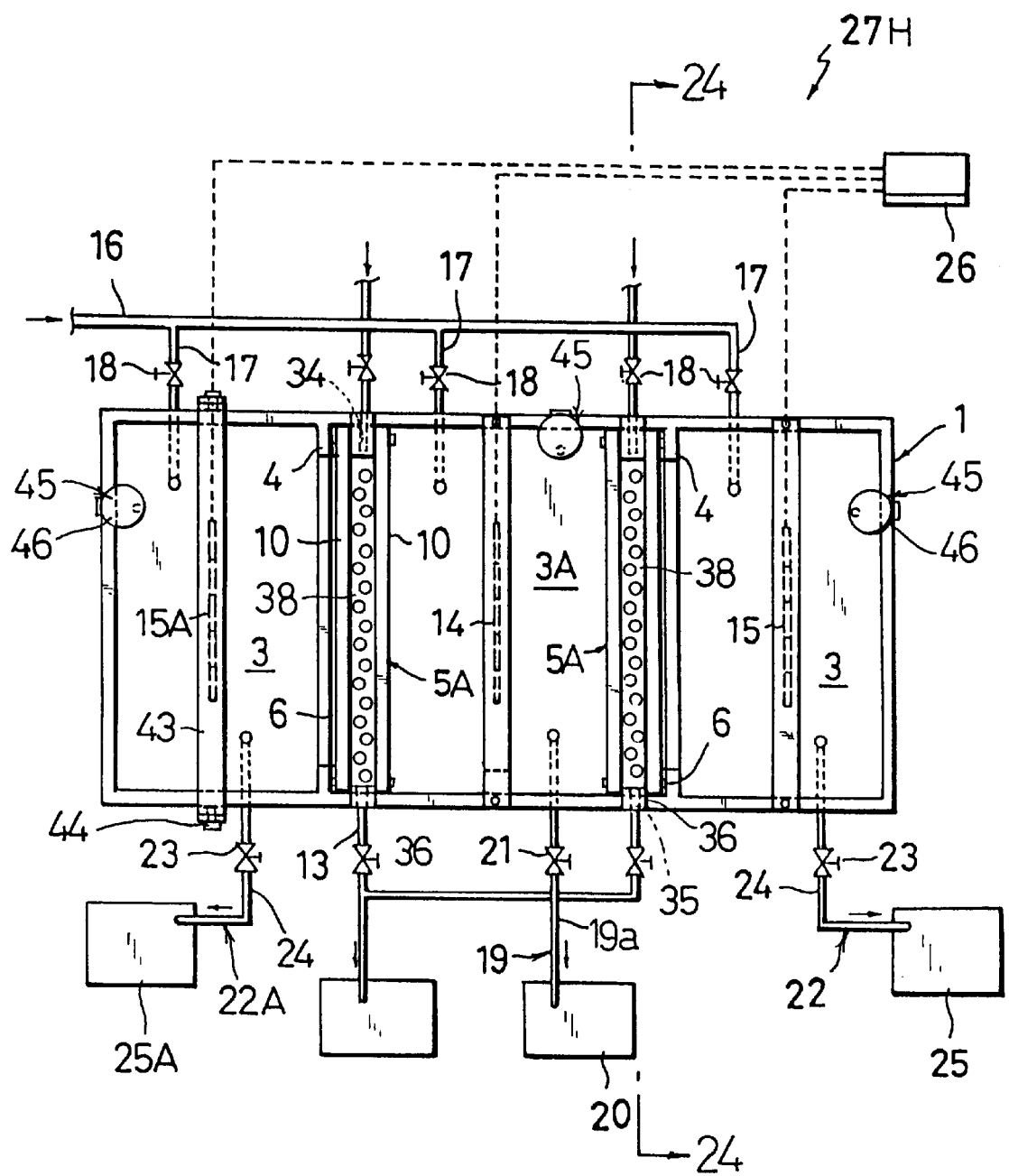
FIG. 22 is a plan view showing a ninth embodiment of the present invention.
Figure 23:
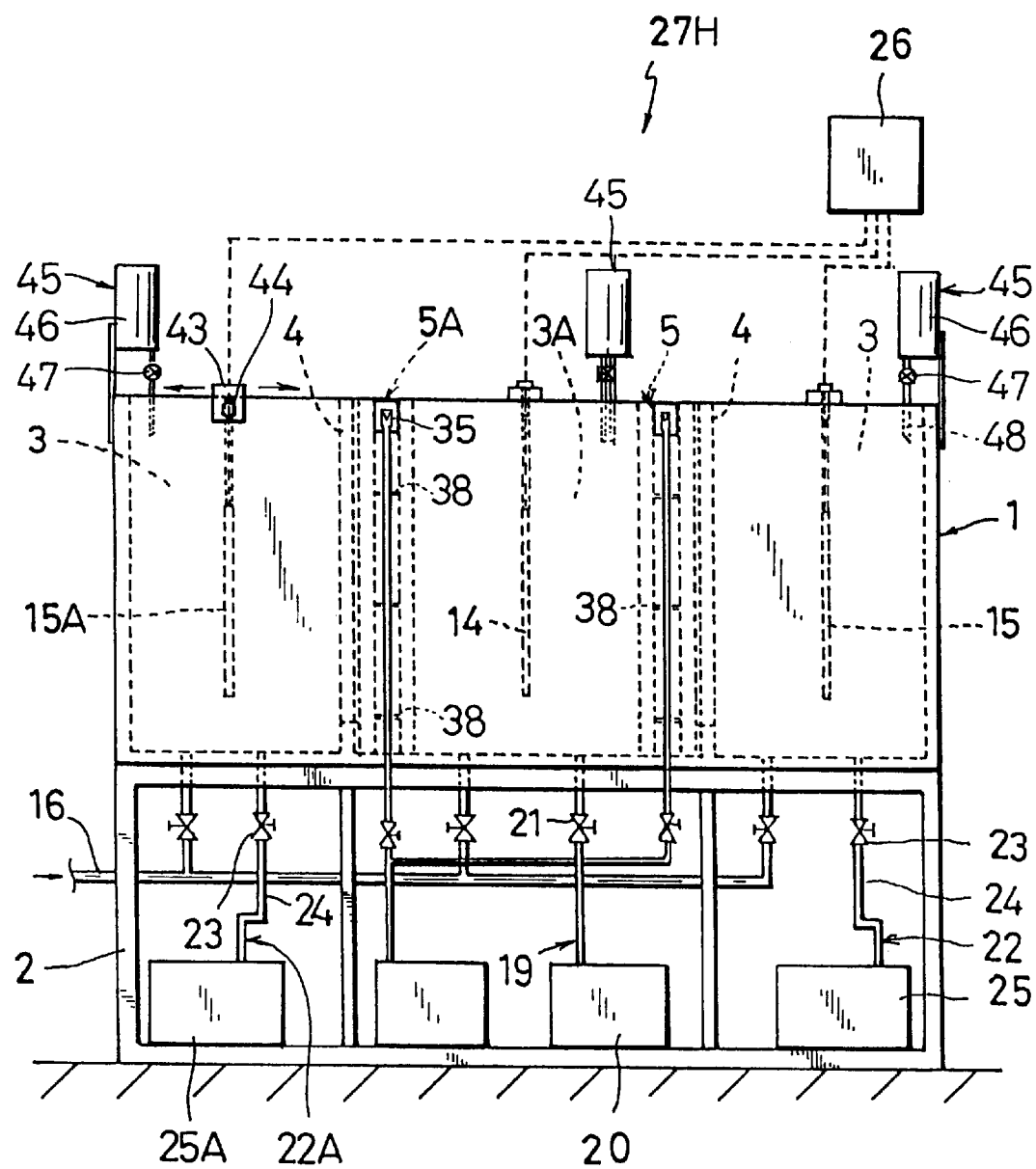
FIG. 23 is a front view showing a ninth embodiment of the present invention.
Figure 24:
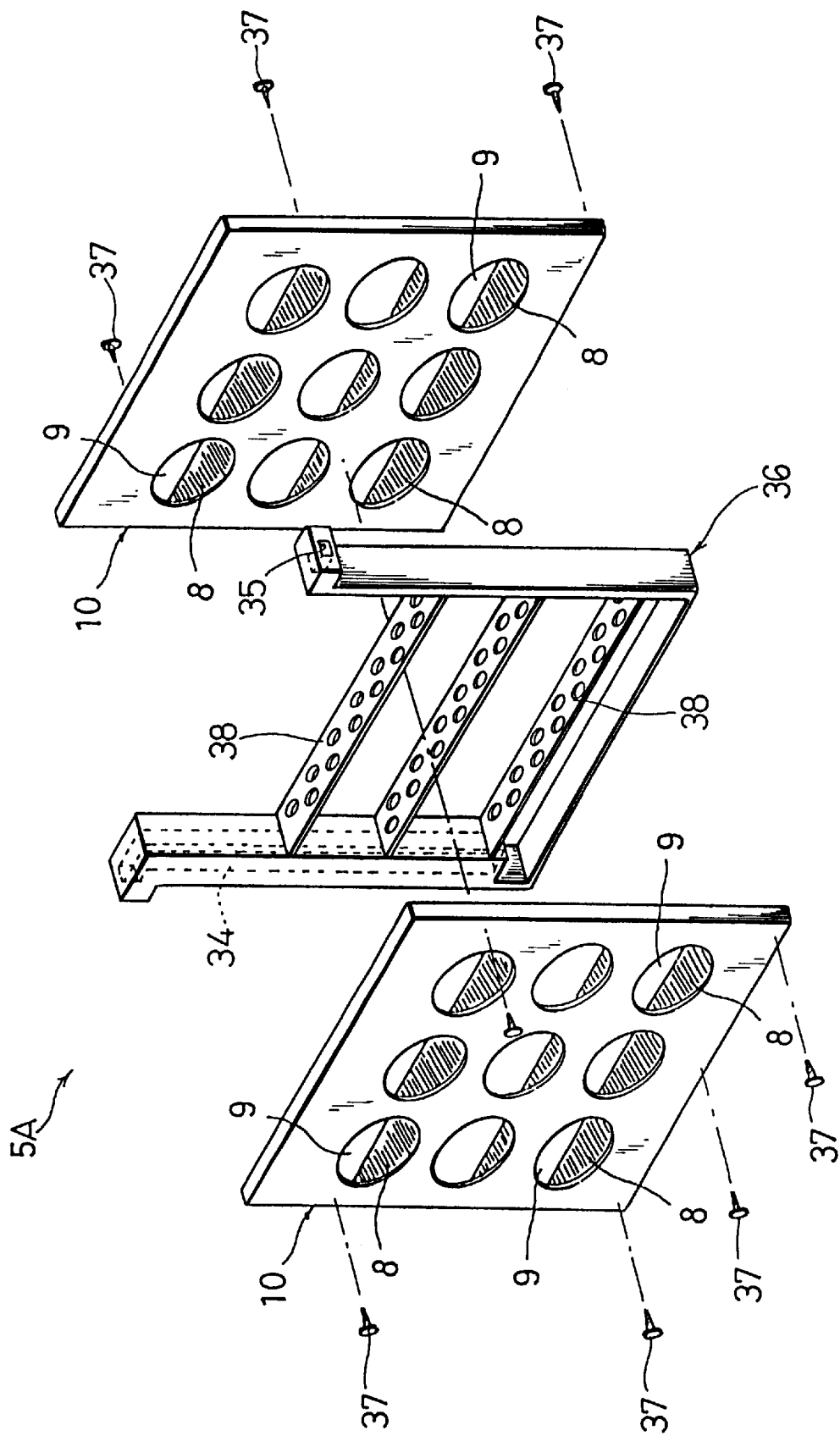
FIG. 24 is an expanded cross sectional view taken along the line 24—24 of FIG. 20.
Figure 25:
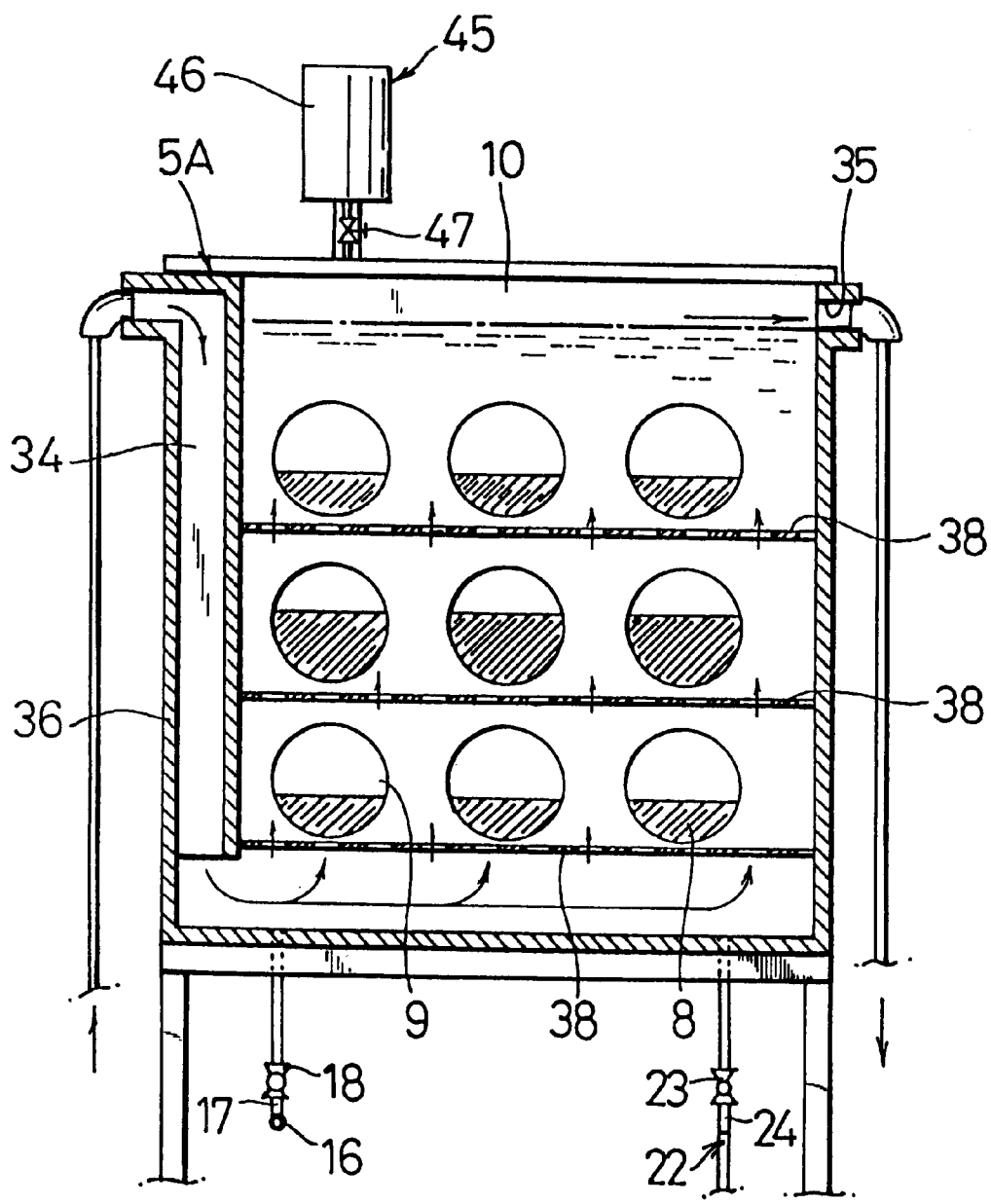
FIG. 25 is an exploded perspective view of a partition wall showing a ninth embodiment of the present invention.

FIGS. 19 to 21 illustrate the eighth embodiment of the present invention; this is distinguished from the first embodiment in that cathode support member 43 is provided which moves glidingly on the upper portion of electrolytic cell 1, and moving equipment 33 of the cathode support member 43 is used in this embodiment. Moving equipment 33 allows a screw shaft 31 with meshing screw hole 30 formed adjacent a center portion of the cathode support member 43 to rotate forward and backward by reversible motor 32 provided to electrolytic cell 1. Device 27G according to the eighth embodiment will provide the same function as that of the first embodiment of the present invention.

Additionally, device 27G can carry out electrolysis while allowing cathode support member 43 to move as far as the fixed position after removable foreign matter such as clothing lint collects in electrolytic chamber 3 because cathode support member 43 moves glidingly by moving equipment 33 and device 27G continues to operate owing to the broad opening of electrolytic chamber 3 in electrolytic cell 1.

FIGS. 22 to 25 illustrate the ninth embodiment of the present invention; this is distinguished from the fifth embodiment in that two partition walls 5A and 5A comprise respectively a frame 36 formed in U-shape; a pair of partition wall bodies 10 and 10; and equalizing plates 38,38,38. The frame 36 further comprises a channel 34 formed at one side wall thereof, extending from upper portion to lower portion thereof, the channel 34 supplying water to raise ion concentration; and spout 35 formed at the upper portion of another side wall. The pair of partition wall bodies 10 and 10 are fixed by a plurality of screws 37 so as to cover both sides of the frame 36, containing cation exchange membranes 8 and anion exchange membranes 9. At least one equalizing plate 38, three of which are used in this embodiment of the present invention, is supported by frame 36 covered by the partition wall bodies 10,10 and is a plate having holes. Device 27H according to the ninth embodiment will provide the same function as of the fifth embodiment of the present invention; in addition, water to raise ion concentration supplied into the partition walls 5A and 5A flows from the lower portion to upper portion in order, so that device 27H allows the efficient production of ion water.

Figure 26:
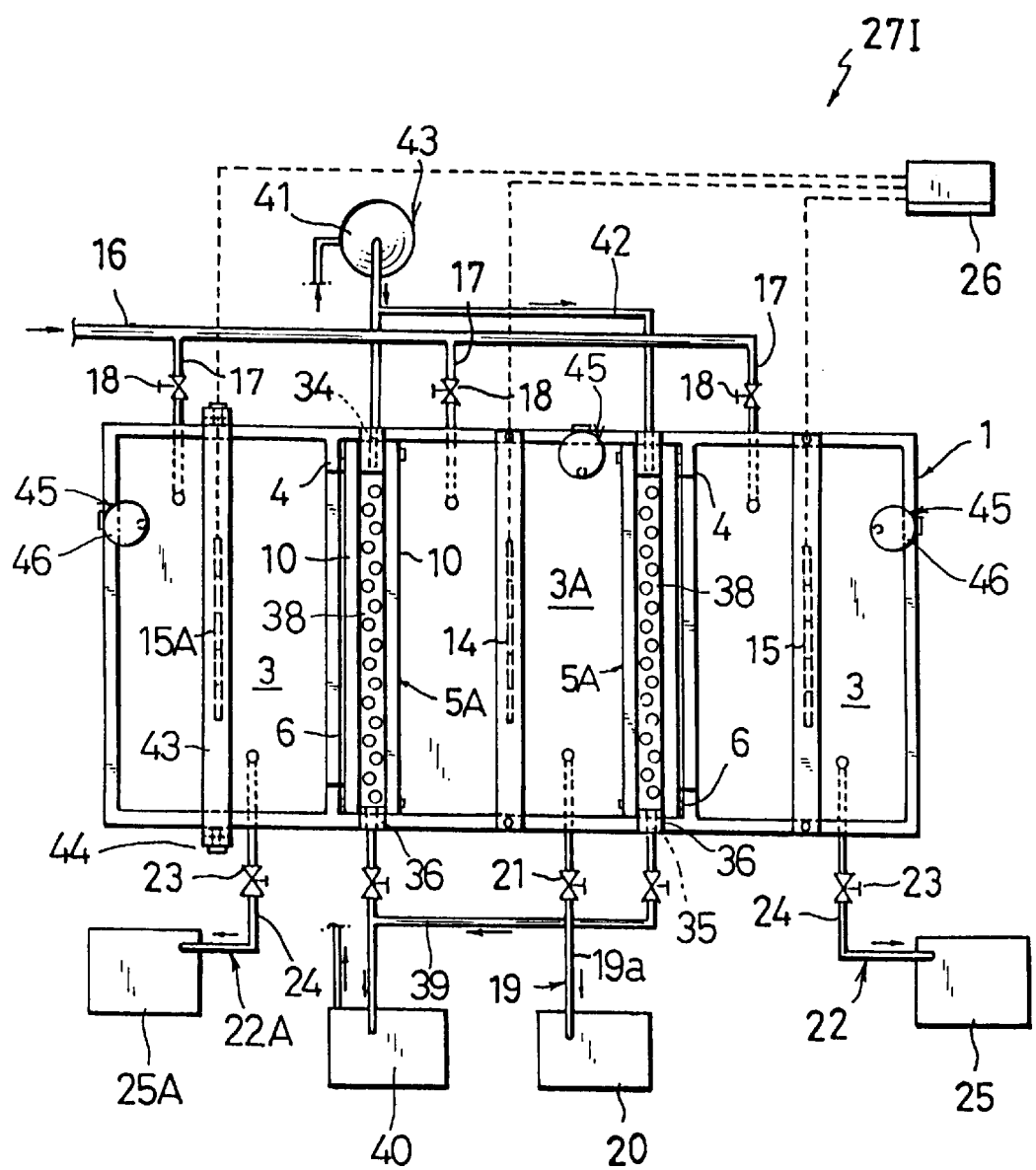
FIG. 26 is a plan view showing a tenth embodiment of the present invention.
Figure 27:
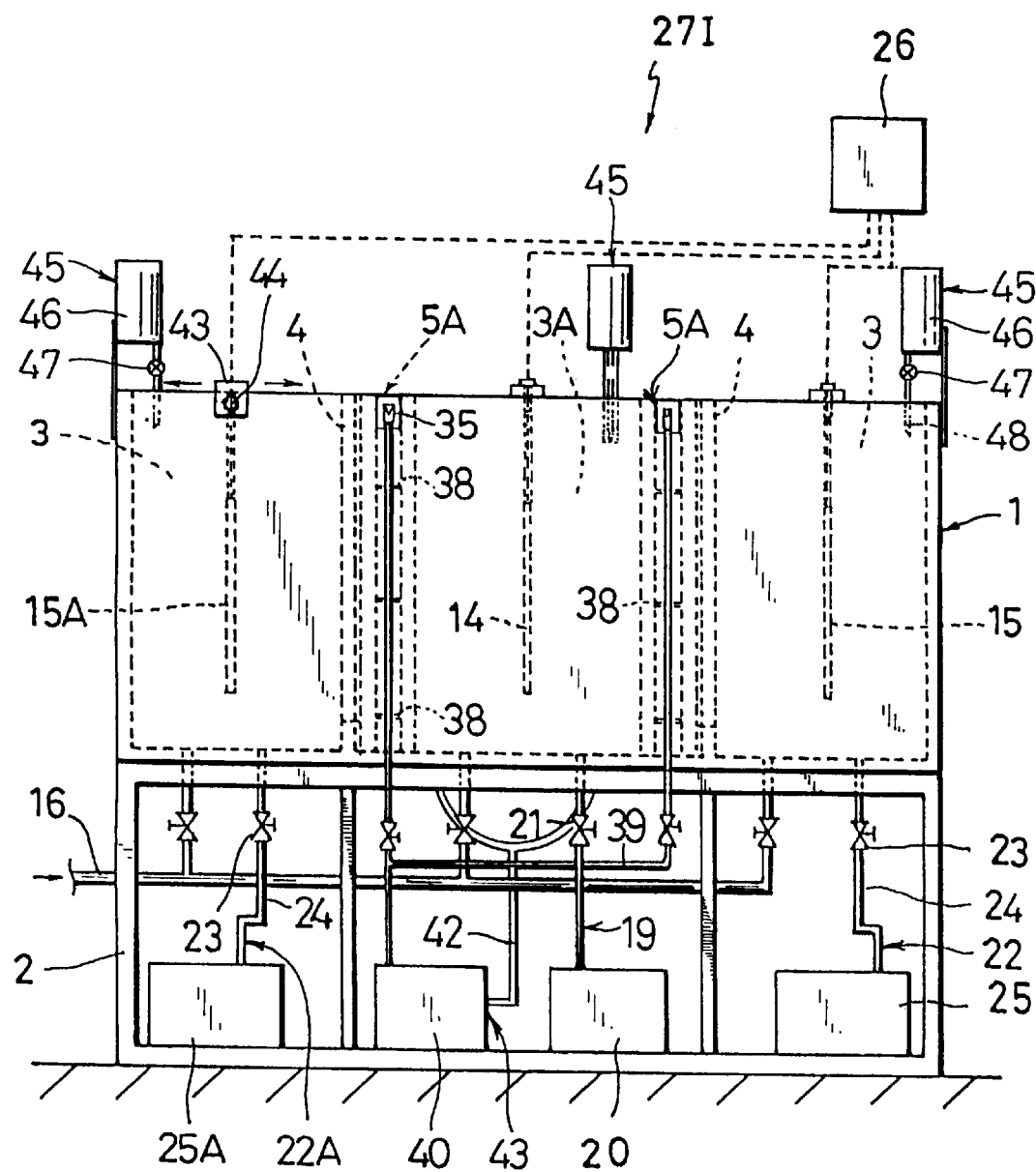
FIG. 27 is a front view showing a tenth embodiment of the present invention.
Figure 28:
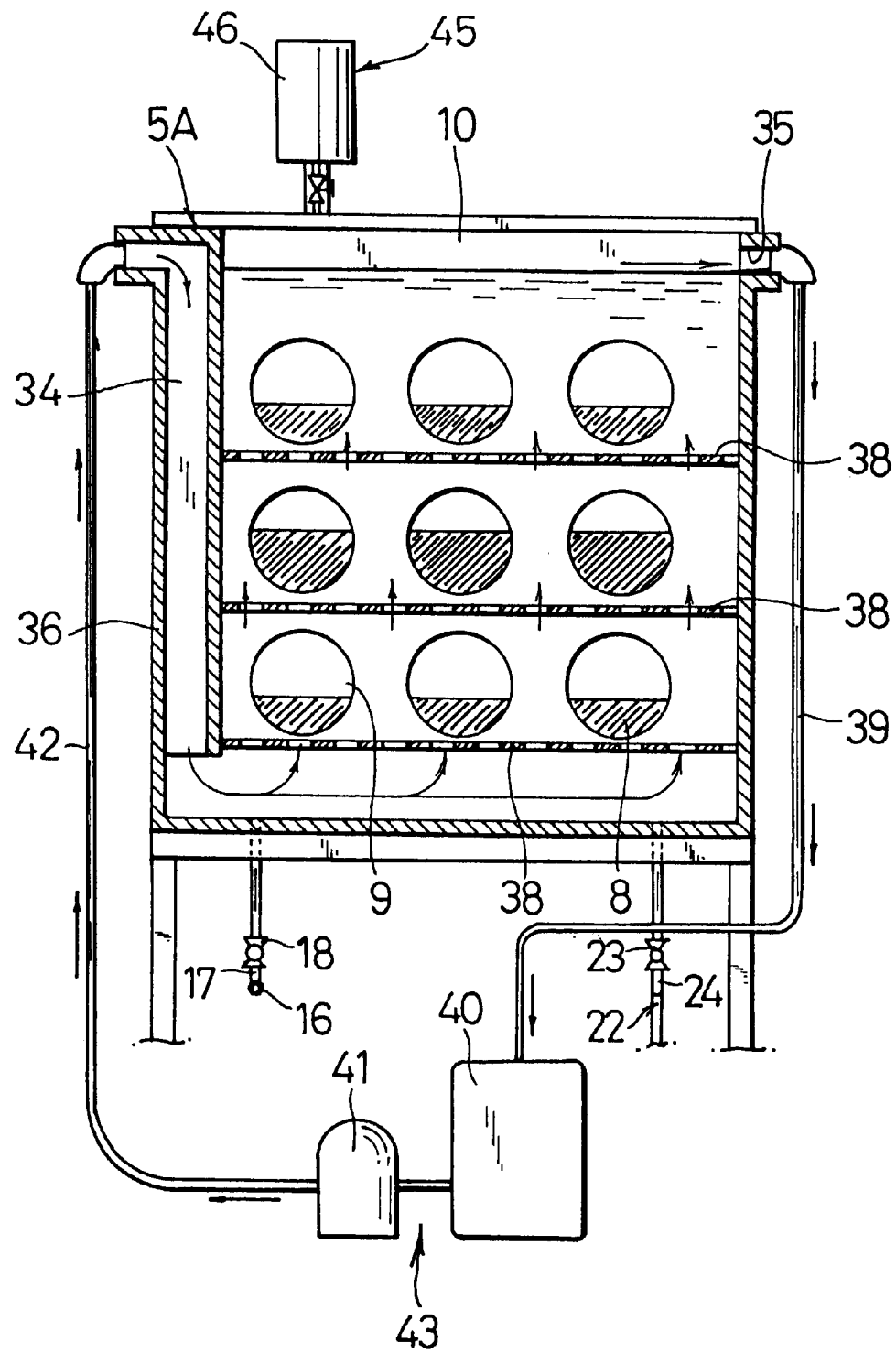
FIG. 28 is an explanation view of an overflow water supplying device showing a tenth embodiment of the present invention.

FIGS. 26 to 28 illustrate the tenth embodiment of the present invention; this is distinguished from the ninth embodiment in that overflow water discharged from spouts 35 and 35 of partition walls 5A and 5A is collected in overflow water collecting tank 40 through hose-pipe 39. Additionally, overflow water supplying device 43 includes supplying hose-pipe 42 interposed between pump 41 and partition wall 5A and device 43 can supply overflow water in overflow water collecting tank 40 to electrolytic chamber 3A. Device 27I according to the tenth embodiment of the present invention can produce acid ion water efficiently by supplying overflow water having a pH in the range of 5 to 6 and used in order to raise ion concentration in electrolytic chamber 3A which produces acid ion water; in addition, device 27I can reuse the discharged water efficiently.

Figure 29:
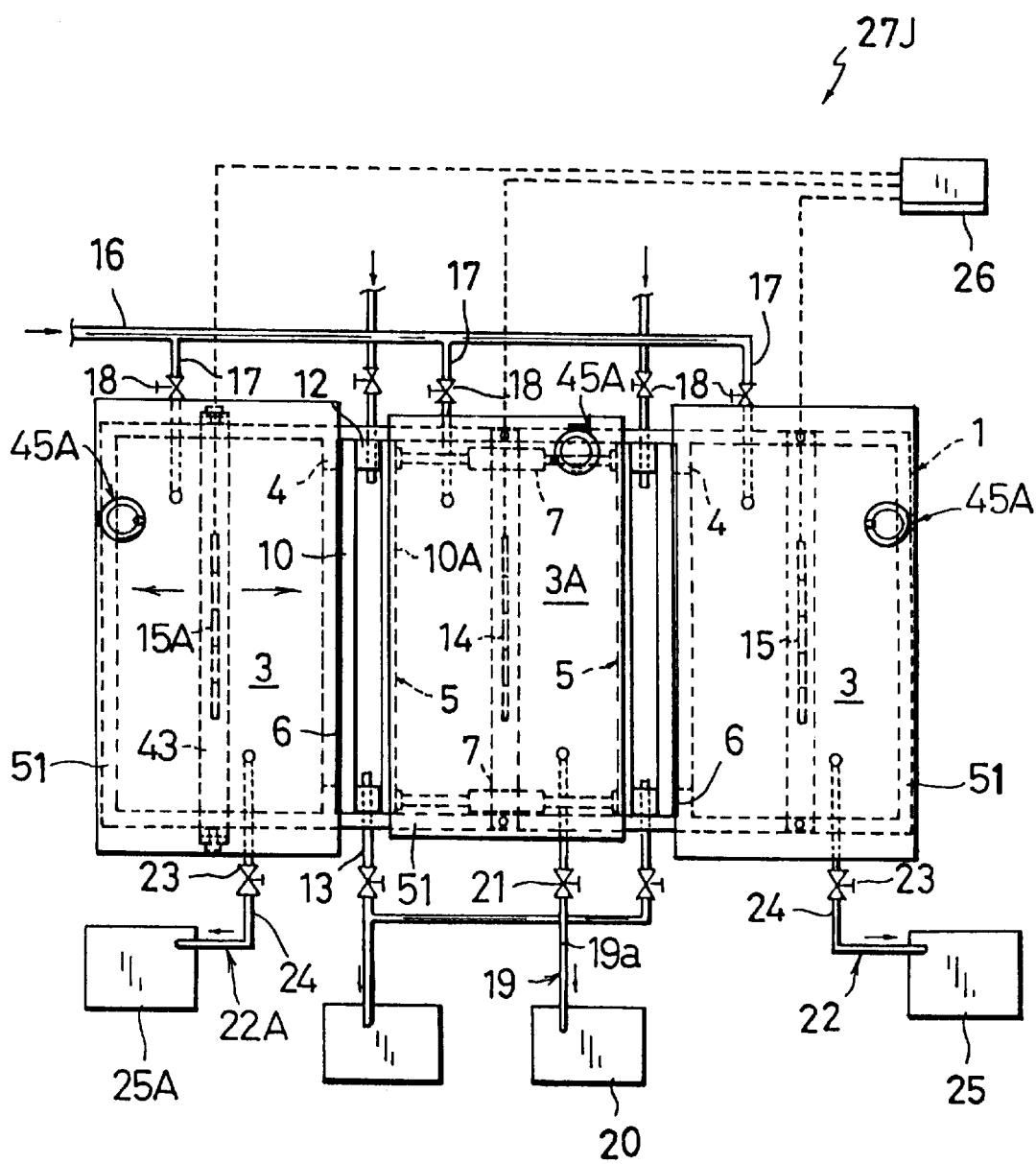
FIG. 29 is a plan view showing an eleventh embodiment of the present invention.
Figure 30:
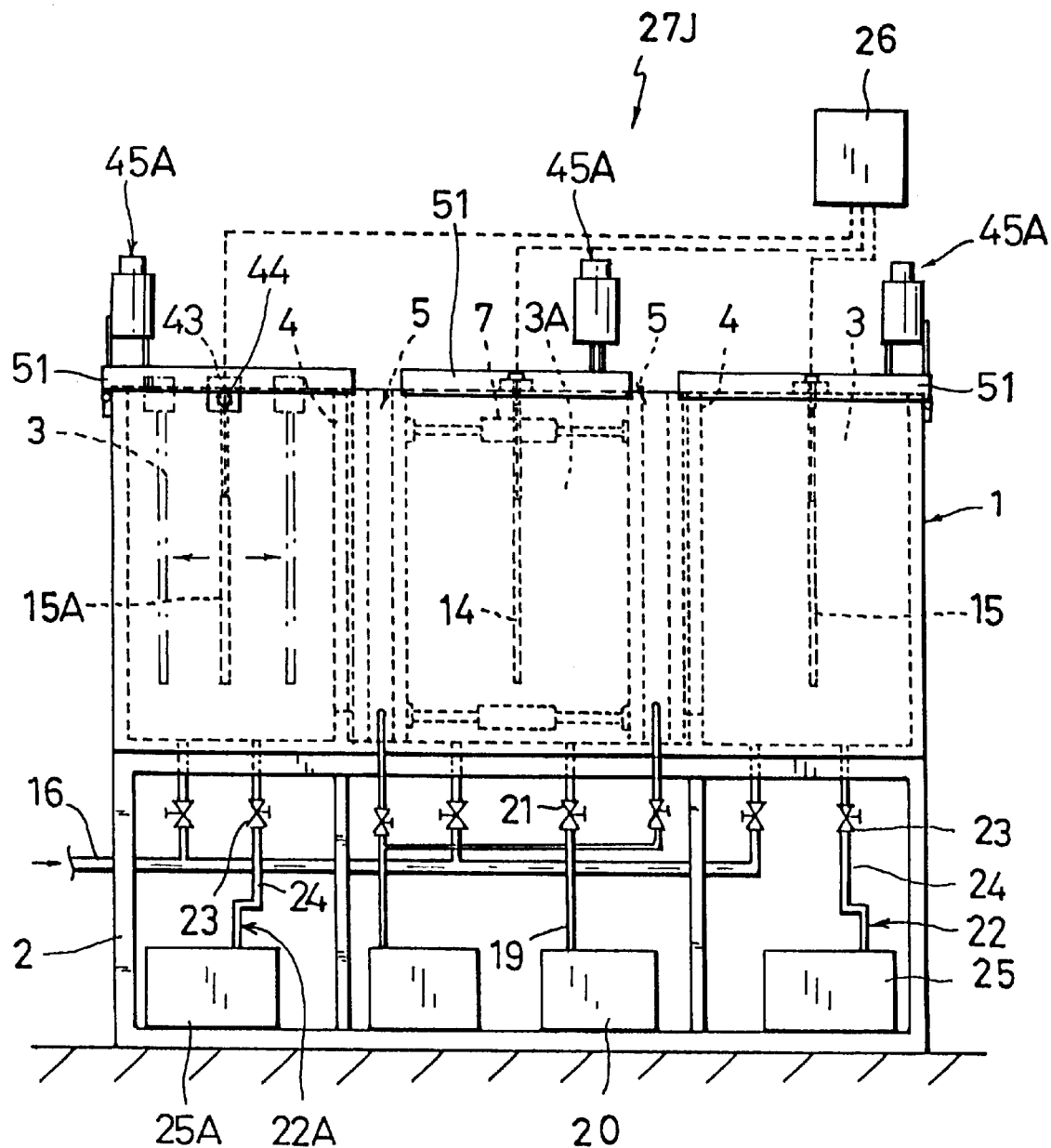
FIG. 30 is a front view showing an eleventh embodiment of the present invention.
Figure 31:
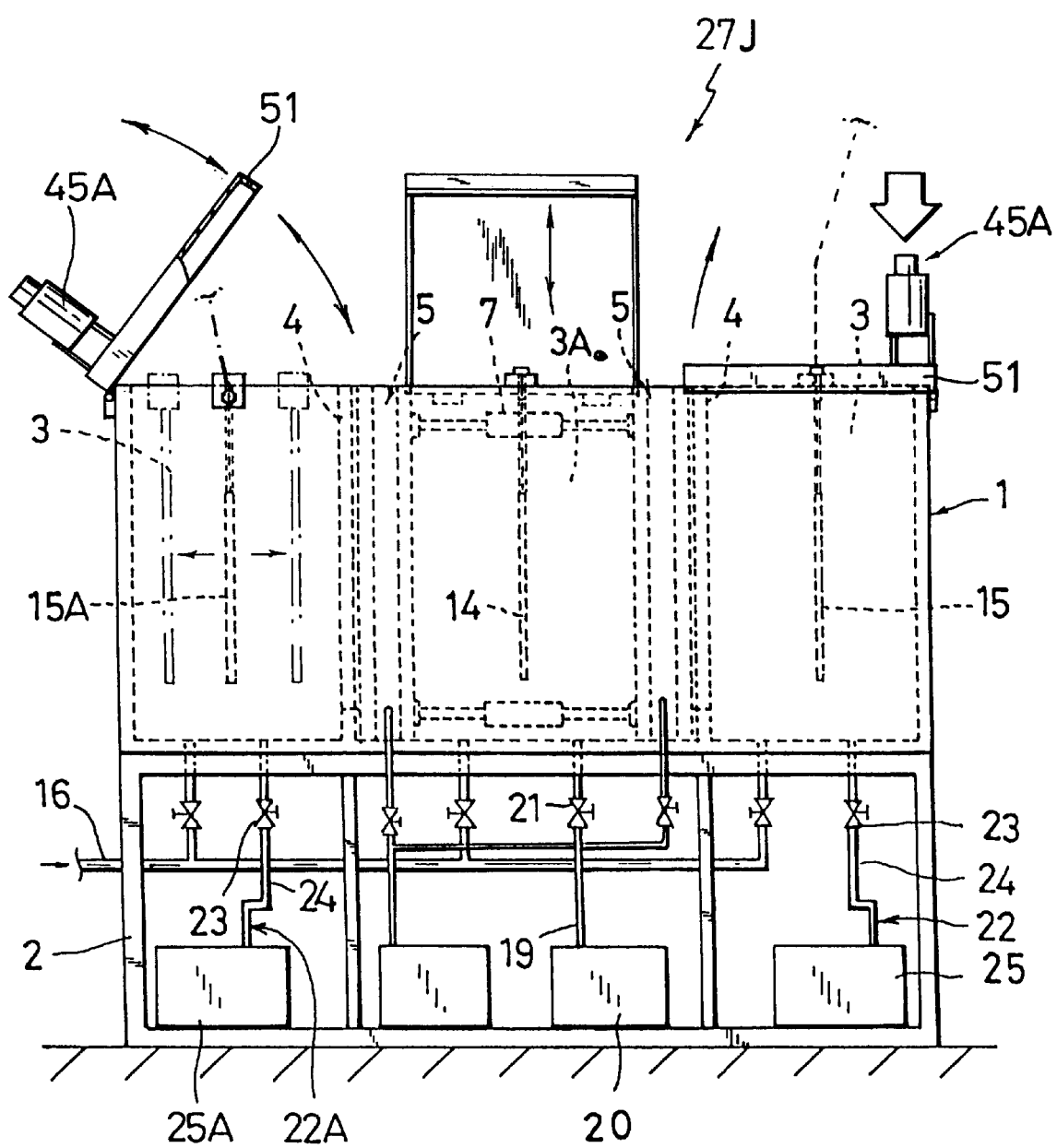
FIG. 31 is an explanation view showing an eleventh embodiment of the present invention wherein a closure member is opened.

FIGS. 29 to 31 illustrate the eleventh embodiment of the present invention; this is distinguished from the first embodiment in that the electrolytic chambers 3,3A,3 are provided with closure members 51,51,51 at an upper portion thereof, the closure members 51 being capable of opening and shutting at the upper portion, and the closure members 51 include spicery supplying devices 45A,45A,45A which have spray cans which can supply gaseous spice into the electrolytic chambers 3,3A,3 when the closure members 51 are closed at the upper portion of electrolytic chambers 3,3A,3. Device 27J having spicery-supplying device 45A according to the eleventh embodiment will provide the same function as that of the first embodiment of the present invention.

Additionally, in each of the embodiments, the movable cathode 15A or the movable anode 14D is described; however, the cathode and anode may be provided fixedly to the electrolytic cell 1.

ADVANTAGES OF THE INVENTION

As set forth above, the advantages of the present invention are as follows:

(1) A device for producing ion water comprises an electrolytic cell; two partition walls equipped with ion exchange membranes disposed such that the electrolytic cell is partitioned into three electrolytic chambers; an anode provided in an intermediate electrolytic chamber of the electrolytic cell; cathodes provided in the electrolytic chambers located at both sides in the electrolytic cell, respectively, each cathode receiving half the amount of electric current which is delivered to the anode; and a spicery-supplying device for delivering a liquid or gaseous spice into the intermediate electrolytic chamber or at least one electrolytic chamber located at both side portions of said electrolytic cell so that alkaline or acid ion water having a pleasant odor can be produced and the quantity of hydrogen ions generated can be determined by the amount of electricity delivered.

Therefore, the desired ph of the ion water can be controlled.

(2) as discussed above, anions and cations that move an electric charge by an electrolysis reaction can be separated and selected by the ion exchange membrane.

(3) as discussed above, the device can be operated easily because it has a simple structure.

(4) since a cation exchange membrane and an anion ion exchange membrane are respectively provided for two partition walls, the generation of pure acid ion water and alkaline ion water can be accomplished.

(5) the quantity of electricity delivered can be increased by the amount of water supplied to the partition walls, and in turn controls the quantity of hydrogen ions generated such that the ion density of the water can be increased.

What is claimed is:

1. A device for producing ion water comprising:
    an electrolytic cell;
    two partition walls disposed such that the electrolytic cell is partitioned into three electrolytic chambers therein, having ion exchange membranes;
    an anode provided in an intermediate electrolytic chamber of said electrolytic cell;
    cathodes in the electrolytic chambers located at both sides in the electrolytic cell, respectively, the cathodes each being fed half the amount of electric current flowing through said anode; and
    a spicery-supplying device delivering a liquid or gaseous spice into said intermediate electrolytic chamber or at least one of said electrolytic chambers located at both side portions of said electrolytic cell used to produce alkaline or acid ion water having a pleasant odor.

2. The device of claim 1, wherein said partition walls have a cation exchange membrane and an anion exchange membrane.

3. The device of claim 1, wherein said partition walls further comprise a pair of partition wall bodies attached to a cation exchange membrane and an anion exchange membrane; a water chamber between the partition walls; and means for supplying water to the water chamber to increase ion density.

4. The device of claim 1, wherein the partition walls each further comprises a partition wall body in the shape of a box having a cation exchange membrane and anion exchange membrane; means for supplying water to raise the ion concentration in the partition wall body from a lower portion thereof; one or more equalizing plates provided in the partition wall body, the equalizing plates acting to equalize the water supplied to said partition wall, and collecting means for overflow water provided at the upper portion of said partition wall.

5. The device of claim 1, wherein the anode includes at least two electrode plates that are platinum plated titanium having a plurality of holes therein.

6. The device of claim 1, wherein the anode includes an element which is platinum plated titanium in the shape of a cylinder, said element being formed of a mesh or a plate having a plurality of holes.

7. The device of claim 1, the wherein the cathode includes an element which is platinum plated titanium said being formed of a mesh or a plate having a plurality of holes.

8. The device of claim 7 wherein each cathode includes an electrode plate in the form of an oval-shaped cylinder having a plurality of holes.

9. The device of claim 7 wherein each cathode includes an electrode element in the form of an oval-shaped cylinder of a mesh woven or knitted from a linear material.

10. The device of claim 1, wherein the cathode includes an element which is platinum plated titanium in the shape of a cylinder, said element being formed of a mesh or a plate having a plurality of holes.

11. The device of claim 1 including at the upper portion of said electrolytic cell closure members incorporating said spicery supplying device which include spicery cans capable of injecting gaseous spice into said electrolytic chambers when the closures are closed.

12. A device for producing ion water comprising:
    an electrolytic cell;
    two partition walls equipped disposed such that the electrolytic cell is partitioned into three electrolytic chambers having ion exchange membranes;
    an anode provided in an intermediate electrolytic chamber of said electrolytic cell;
    two cathodes provided in the electrolytic chambers located at both side portions of the electrolytic cell, the cathodes each being fed half amount of an electric current which flows through the anode;
    at least one of said anode or said cathodes being adjustable to move, so as to change the distance between said anode and cathode
    a spicery-supplying device for delivering a liquid or gaseous spice into the intermediate electrolytic chamber or at least one of said electrolytic chambers located at both side portions of said electrolytic cell for producing alkaline or acid ion water having a pleasant smell.

13. The device of claim 12 wherein said anode is adjustable and comprises a movable support member locked by bolts for fixing the anode in an optional position.

14. The device of claim 12 wherein at least one of said cathodes is equipped with a support member which moves glidingly on the upper portion of said electrolytic cell and a moving equipment comprising a screw shaft with meshing screw hole formed adjacent the center portion of said support member and fitted with a reversible motor for moving said screw shaft.

* * * * *